US010094724B2

(12) United States Patent
Shimoyama et al.

(10) Patent No.: US 10,094,724 B2
(45) Date of Patent: Oct. 9, 2018

(54) PRESSURE SENSOR

(71) Applicants: SEIKO INSTRUMENTS INC., Chiba-shi, Chiba (JP); THE UNIVERSITY OF TOKYO, Tokyo (JP)

(72) Inventors: Isao Shimoyama, Tokyo (JP); Kiyoshi Matsumoto, Tokyo (JP); Hidetoshi Takahashi, Tokyo (JP); Minh-Dung Nguyen, Tokyo (JP); Takeshi Uchiyama, Chiba (JP); Manabu Oumi, Chiba (JP); Yoko Shinohara, Chiba (JP); Masayuki Suda, Chiba (JP)

(73) Assignees: SEIKO INSTRUMENTS INC., Chiba-shi (JP); THE UNIVERSITY OF TOKYO, Tokyo (JP)

( * ) Notice: Subject to any disclaimer, the term of this patent is extended or adjusted under 35 U.S.C. 154(b) by 138 days.

(21) Appl. No.: 15/117,272

(22) PCT Filed: Feb. 27, 2015

(86) PCT No.: PCT/JP2015/055848
§ 371 (c)(1),
(2) Date: Aug. 8, 2016

(87) PCT Pub. No.: WO2015/137160
PCT Pub. Date: Sep. 17, 2015

(65) Prior Publication Data
US 2016/0349130 A1 Dec. 1, 2016

(30) Foreign Application Priority Data

Mar. 13, 2014 (JP) .................................. 2014-050553

(51) Int. Cl.
*G01L 9/00* (2006.01)
*G01L 23/18* (2006.01)

(52) U.S. Cl.
CPC .......... *G01L 9/0052* (2013.01); *G01L 9/0002* (2013.01); *G01L 23/18* (2013.01)

(58) Field of Classification Search
CPC ... G01L 9/0042; G01L 9/0048; G01L 9/0052; G01L 9/0054; G01L 23/18
(Continued)

(56) References Cited

U.S. PATENT DOCUMENTS 5,115,292 A * 5/1992 Takebe ................ G01P 15/0802
257/254
2006/0144153 A1 7/2006 Brosh
(Continued)

FOREIGN PATENT DOCUMENTS

EP 2541222 A1 1/2013
EP 2669648 A1 12/2013
(Continued)

OTHER PUBLICATIONS

Jul. 25, 2017 Office Action issued in Japanese Patent Application No. 2016-507450.
(Continued)

*Primary Examiner* — Benjamin Schmitt
(74) *Attorney, Agent, or Firm* — Oliff PLC

(57) ABSTRACT

A pressure sensor which detects variation in pressures, the pressure sensor including a cantilever which is bent according to a pressure difference between the inside and the outside of a cavity in a sensor main body, and an intra-lever gap which is formed on a proximal end portion of the cantilever. The proximal end portion is partitioned into a first support portion and a second support portion by an intra-lever gap in a second direction orthogonal to a first direction in which the proximal end portion and a distal end portion are connected to each other in plan view. A doped layer which is provided on a portion of the first and second
(Continued)

support portions forms a first displacement detection portion and a second displacement detection portion. Lengths of the first and second displacement detection portions are shorter than those of the first and second supports along the second direction.

9 Claims, 15 Drawing Sheets

(58) Field of Classification Search
USPC .............. 73/727, 756, 862.637, 862.639
See application file for complete search history.

(56) References Cited

U.S. PATENT DOCUMENTS

| | | | |
|---|---|---|---|
| 2010/0058499 A1* | 3/2010 | Shigeno | G01Q 20/04 850/21 |
| 2010/0102403 A1 | 4/2010 | Celik-Butler et al. | |
| 2010/0107284 A1* | 4/2010 | Shigeno | G01G 3/12 850/5 |
| 2013/0247676 A1 | 9/2013 | Uchiyama et al. | |
| 2013/0247677 A1 | 9/2013 | Uchiyama et al. | |

FOREIGN PATENT DOCUMENTS

| | | |
|---|---|---|
| JP | H06-324074 A | 11/1994 |
| JP | H07-234243 A | 9/1995 |
| JP | 2000-214027 A | 8/2000 |
| JP | 2003-156510 A | 5/2003 |
| JP | 2009-264905 A | 11/2009 |
| JP | 2013-234853 A | 11/2013 |

OTHER PUBLICATIONS

Oct. 9, 2017 Search Report issued in European Patent Application No. 15762325.7.

Mar. 24, 2015 Search Report issued in International Patent Application No. PCT/JP2015/055848.

* cited by examiner

PRESSURE SENSOR

TECHNICAL FIELD

The present invention relates to a pressure sensor.

Priority is claimed on Japanese Patent Application No. 2014-050553, filed Mar. 13, 2014, the content of which is incorporated herein by reference.

BACKGROUND ART

In the related art, for example, as a pressure sensor which detects variation in pressures, a pressure sensor is known which includes a substrate which has a gap portion inside the substrate, a diaphragm portion which configures a portion of an inner wall of the gap portion, and a pressure-sensitive element such as a piezoresistor which is provided on the surface of the diaphragm portion (for example, refer to PTL 1).

According to this pressure sensor, an electrical resistance of the pressure-sensitive element is changed according to a magnitude of deformation of the diaphragm portion due to an external pressure. As a result, the pressure sensor can detect a pressure applied to the diaphragm portion on the basis of a voltage change generated in the pressure-sensitive element.

CITATION LIST

Patent Literature

[PTL 1] Japanese Published Unexamined Patent Application No. 2009-264905

SUMMARY OF INVENTION

Technical Problem

However, since the pressure sensor in the related art detects the voltage change generated in the pressure-sensitive element by constantly supplying power to the pressure-sensitive element such as the piezoresistor, there is a problem in that power consumption is high. In addition, since there is a concern that a leakage current may occur between the plurality of adjacent pressure-sensitive elements which are provided on the surface of the diaphragm, it is preferable to reduce the occurrence of the leakage current.

The present invention is made in consideration of the above-described circumstances, and an object thereof is to provide a pressure sensor in which it is possible to decrease power consumption due to pressure detection and reduce the occurrence of a leakage current.

Solution to Problem (1) According to an aspect of the present invention, a pressure sensor which detects variation in pressures is provided, including: a hollow sensor main body which includes a cavity formed inside the sensor main body and a communication opening which allows the cavity and the outside of the sensor main body to communicate with each other; and a cantilever which is disposed so as to close the communication opening in a cantilever state in which a distal end portion of the cantilever is a free end and a proximal end portion thereof is supported by the sensor main body, and which is bent according to a pressure difference between the cavity and the outside of the sensor main body, in which a gap which configures a portion of the communication opening is formed on the proximal end portion, the proximal end portion is partitioned into a plurality of branch portions by the gap in a second direction orthogonal to a first direction in which the proximal end portion and the distal end portion are connected to each other in plan view, at least any one of the plurality of branch portions includes a displacement detection portion which detects displacement according to the bending of the cantilever on the basis of a change in a resistance value corresponding to the displacement, and a length of the displacement detection portion along the second direction is shorter than a length of the branch portion along the second direction.

(2) The displacement detection portion may be configured of a piezoresistor, and a resistance value of a portion on the proximal end portion side may be larger than a resistance value of a portion on the distal end portion side in the first direction.

(3) The displacement detection portion may include a plurality of branch detection portions which are electrically separated from each other in the second direction by a partition portion having a larger resistance value than that of the displacement detection portion, and the branch detection portions may be electrically connected to each other so as to wrap around the outside of the partition portion.

(4) The partition portion may be a detection portion gap which configures a portion of the communication opening.

(5) The branch detection portions may be connected to electrodes which are different from each other.

(6) The pressure sensor may further include a plurality of reference portions which include a lever portion which is made of the same material and has the same shape as those of the cantilever, a plurality of shape portions which are formed on the lever portion and have the same shapes as those of the plurality of branch portions, and a piezoresistor which is provided in at least any one of the plurality of shape portions, and in which the reference portions have the same shapes as those of the plurality of branch detection portions; and a signal output portion which outputs a signal corresponding to a difference between each of the plurality of branch detection portions and each of the plurality of reference portions.

(7) The displacement detection portion may be configured of a piezoresistor which is formed such that a length of the piezoresistor along the first direction is shorter than a length thereof along the second direction.

(8) Displacement detection portions may be separately provided on at least two adjacent branch portions among the plurality of branch portions, and the displacement detection portions which are provided in the two branch portions may be electrically connected to each other in series.

(9) Displacement detection portions may be separately provided on at least two adjacent branch portions among the plurality of branch portions, and the displacement detection portions which are provided in the two branch portions may be electrically separated from each other.

Advantageous Effects of Invention (1) According to the present invention, compared to a case where the lengths (widths) of the displacement detection portion and the plurality of branch portions in the second direction (that is, width direction) are the same as each other, it is possible to increase a resistance value of the displacement detection portion. Accordingly, it is possible to decrease a current, that is, power consumption in a case where a predetermined voltage is applied to the displacement detection portion.

In addition, in a case where the displacement detection portion is provided in each of the plurality of branch portions partitioned by gaps, there is a reduced occurrence of leaks between the displacement detection portions adjacent in the second direction, and it is possible to improve detection accuracy.

(2) According to the present invention, for example, since the shape of the portion on the proximal end portion side of the displacement detection portion is smaller than the shape of the portion on the distal end portion side, or the like, the resistance of the portion on the proximal end portion side is larger (higher) than the resistance value of the portion on the distal end portion side. Accordingly, it is possible to decrease a current, that is, power consumption in a case where a predetermined voltage is applied to the displacement detection portion. In addition, since the resistance value of the portion on the proximal end portion side having increased stress concentration is larger than that of the portion on the distal end portion side, a change in the resistance values over the entire power-supply path of the displacement detection portion according to the displacement of the cantilever increases, and it is possible to improve detection sensitivity.

(3) According to the present invention, the resistance value of the power-supply path, which is detected by the branch detection portions which are electrically connected to each other so as to wrap around the outside (outer circumference) of the partition portion, is obtained by adding up the resistance values of the complementary branch detection portions. Accordingly, compared to a case where the displacement detection portion is not partitioned into the plurality of branch detection portions, it is possible to increase the resistance value effective for detecting the displacement of the cantilever, to improve detection sensitivity, and to decrease power consumption.

(4) According to the present invention, it is possible to easily form the partition portion having the resistance value which is larger than that of the displacement detection portion. In addition, since the detection portion gap is provided between the adjacent branch detection portions in the second direction, there is a reduced occurrence of leaks between the adjacent branch detection portions, and it is possible to improve detection accuracy.

(5) According to the present invention, since the plurality of branch detection portions are connected to the electrodes different from each other, for example, it is possible to additionally detect a change in the resistance values of each of the plurality of branch detection portions according to the displacement of the cantilever using a Wheatstone bridge circuit or the like, and to improve detection sensitivity.

(6) According to the present invention, changes of parasitic capacitance and wiring capacity in the pressure sensor or the like, and sensitivity changes due to environmental changes such as temperature changes can be made to cancel each other out, and it is possible to accurately perform the detection with respect to variation in pressures.

(7) According to the present invention, since the length in the second direction of the displacement detection portion is longer than the length in the first direction thereof, it is possible to dispose the displacement detection portion along a bending line when the cantilever is bent. Accordingly, since it is possible to dispose the displacement detection portion at a position at which stress usually concentrates when the cantilever is bent, it is possible to further improve detection sensitivity. In addition, since it is possible to prevent the entire displacement detection portion from being distorted due to the bending of the cantilever, it is possible to effectively improve the detection sensitivity. Moreover, since the length of the displacement detection portion along the first direction can be shortened, the resistance value can be easily increased, and it is possible to decrease power consumption.

(8) According to the present invention, since the displacement detection portions are connected to each other in series, it is possible to further increase the entire resistance value. Accordingly, it is possible to further improve detection sensitivity, and to further decrease power consumption.

(9) According to the present invention, since the displacement detection portions are electrically separated from each other, for example, it is possible to additionally detect a change in the resistance values of each of the displacement detection portions using a Wheatstone bridge circuit or the like. Accordingly, it is possible to improve detection sensitivity.

DESCRIPTION OF EMBODIMENTS

First Embodiment

Hereinafter, a first embodiment of a pressure sensor according to the present invention is described with reference to the drawings.

A pressure sensor 1 of the present embodiment is a sensor which detects variation in pressures of a predetermined frequency band, and is disposed in a space in which an appropriate pressure transmission medium (for example, gas such as air, liquid, or the like) exists, or the like.

Figure 1:
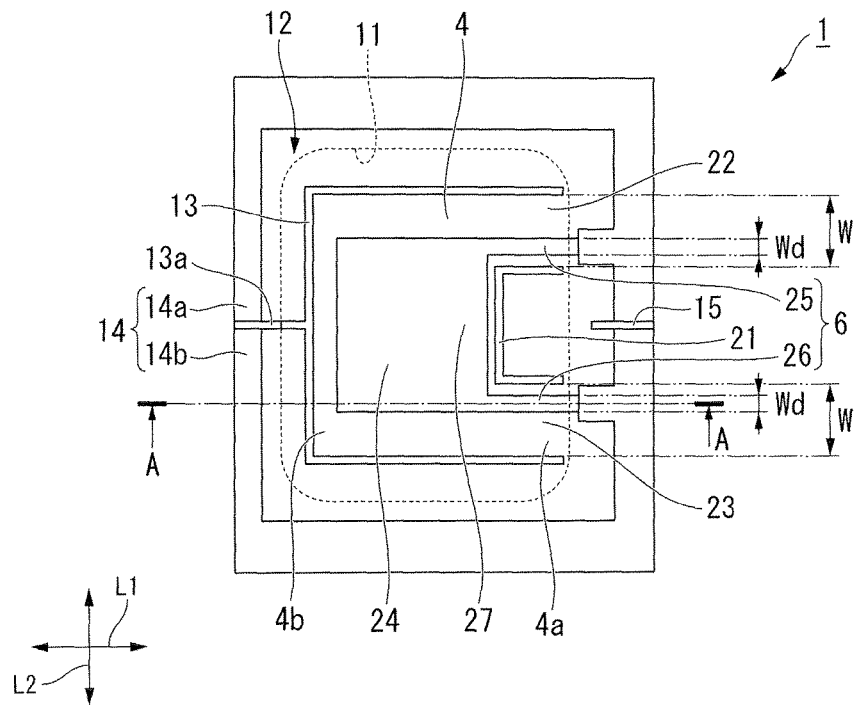
FIG. 1 is a plan view showing a configuration of a pressure sensor according to a first embodiment of the present invention.
Figure 2:
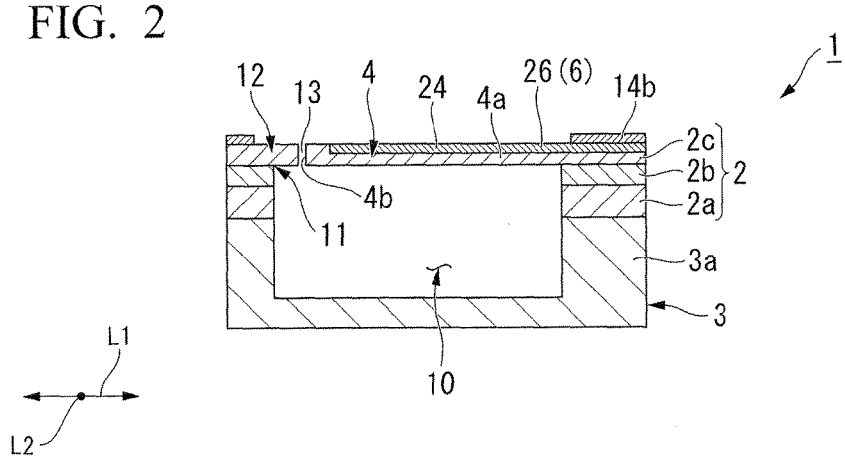
FIG. 2 is a sectional view showing the pressure sensor taken along line A-A shown in FIG. 1.

As shown in FIGS. 1 and 2, for example, the pressure sensor 1 has a shape in which a SOI substrate 2 and a sensor main body 3 are integrally fixed to each other, and includes a cantilever 4 which is formed on the SOI substrate 2, and a detection portion 6 which is connected to the cantilever 4 and detect displacement of the cantilever 4.

The SOI substrate 2 is formed by thermally bonding a silicon support layer 2a, an electrically insulating oxide layer 2b such as a silicon oxide film, and a silicon active layer 2c.

For example, the sensor main body 3 has a hollow box shape which is formed of a resin material. The 501 substrate 2 is integrally fixed to the distal end (upper end) of an annular wall portion 3a of the sensor main body 3.

The silicon support layer 2a and the oxide layer 2b are annularly formed similarly to the wall portion 3a. The sensor main body 3, the silicon support layer 2a, and the oxide layer 2b have a hollow box shape as a whole, and form an internal space functioning as a cavity 10. A communication opening 11 communicating with the inside and the outside of the cavity 10 is formed at a location corresponding to the opening of each of the sensor main body 3, the silicon support layer 2a, and the oxide layer 2b.

The cantilever 4 is formed of the silicon active layer 2c of the SOI substrate 2. Specifically, the cantilever 4 is formed by shaping a gap 13 such that the cantilever 4 and the frame portion 12 are formed from the flat-plate shaped silicon active layer 2c.

The cantilever 4 has a cantilever structure in which a distal end portion 4b thereof is a free end and a proximal end portion 4a thereof is a fixed end. The proximal end portion 4a is fixed to the wall portion 3a of the sensor main body 3 via the silicon support layer 2a and the oxide layer 2b. The cantilever 4 is formed to be smaller than the size of the communication opening 11 which is formed of the sensor main body 3, the silicon support layer 2a, and the oxide layer 2b.

In the present embodiment, in a plan view of the pressure sensor 1, a direction in which the proximal end portion 4a and the distal end portion 4b of the cantilever 4 are connected to each other is defined as a first direction (hereinafter, referred to as a first direction L1), and a direction orthogonal to the first direction L1 is defined as a second direction (hereinafter, referred to as a second direction L2).

In addition, the first direction L1 corresponds to a length direction (depth direction) of the pressure sensor 1, and the second direction L2 corresponds to a width direction of the pressure sensor 1.

The gap 13 is provided in a region which communicates with the inside of the cavity 10 from the distal end portion 4b of the cantilever 4 toward the proximal end portion 4a. Accordingly, the gap 13 is disposed to configure a portion of the communication opening 11 (or to be included in the communication opening 11) which is formed by the sensor main body 3, the silicon support layer 2a, and the oxide layer 2b.

Moreover, as shown in FIG. 2, since the above-described cavity 10 is a bottomed box-shaped space in which a portion except for the gap 13 is sealed, it is possible to allow the pressure transmission medium to flow toward the outer portion and the inner portion via only the gap 13.

Here, when the entire SOI substrate 2 is viewed, the SOI substrate 2 is laminated on the sensor main body 3 so as to close the communication opening 11 of the sensor main body 3 and is integrally fixed to the sensor main body 3. In the SOI substrate 2, the silicon support layer 2a and the oxide layer 2b, which are annularly formed similarly to the wall portion 3a of the sensor main body 3, are continuous with the wall portion 3a of the sensor main body 3 and are provided to extend from the wall portion 3a toward upward. In addition, the silicon active layer 2c forming the cantilever 4 is disposed so as to close the communication opening 11 which is formed by the sensor main body 3, the silicon support layer 2a, and the oxide layer 2b.

Accordingly, the gap 13 which is provided on the silicon active layer 2c so as to form the cantilever 4 is disposed to configure a portion of the communication opening 11 (or to be included in the communication opening 11) of the sensor main body 3.

Since the cantilever 4 has a cantilever structure in which the proximal end portion 4a is a fixed end and the distal end portion 4b is a free end, the cantilever 4 can be bent according to a pressure difference (that is, a pressure difference due to the pressure transmission medium which can flow between the inside and the outside of the cavity 10 via the gap 13) of the inside and the outside of the cavity 10 with the proximal end portion 4a as a center.

In addition, in the frame portion 12, an electrode 14 formed of a conductive material such as Au is formed on the surface of the silicon active layer 2c of the SOI substrate 2 in a peripheral edge portion outside from the communication opening 11.

The electrode 14 is electrically divided into a first electrode 14a and a second electrode 14b by two gaps penetrating the silicon active layer 2c of the SOI substrate 2. For example, the two gaps include a branch gap 13a which is formed so as to be branched from the gap 13 and an inter-electrode gap 15 which is provided independently from the gap 13.

Figure 3:
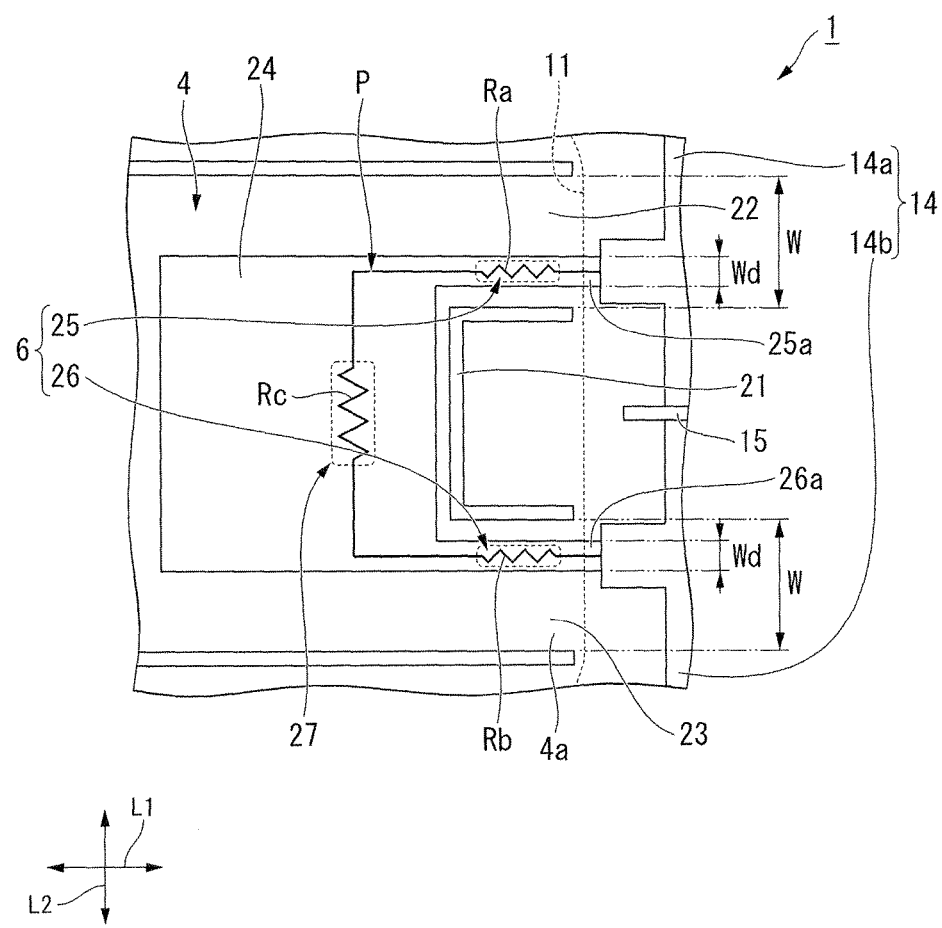
FIG. 3 is a plan view showing an enlarged configuration in the vicinity of a proximal end portion of a cantilever of the pressure sensor shown in FIG. 1.

As shown in FIGS. 1 and 3, an intra-lever gap 21 which extends at a predetermined length in the first direction L1 and has a U shape in plan view is formed on the proximal end portion 4a of the cantilever 4.

The intra-lever gap 21 is a through-hole which penetrates in a thickness direction of the cantilever 4, and is provided independently from the gap 13 in a region which communicates with the inside of the cavity 10 from the proximal end portion 4a toward the distal end portion 4b along the first direction L1. That is, the intra-lever gap 21 is formed to configure a portion of the communication opening 11 (or to be included in the communication opening 11) of the sensor main body 3.

The intra-lever gap 21 electrically partitions the proximal end portion 4a of the cantilever 4 into a plurality of branch portion, that is, a first support portion 22 and a second support portion 23 in the second direction L2 (that is, width direction) orthogonal to the first direction L1.

The first and second support portions 22 and 23 are positioned on both end portion sides in the second direction L2 in the cantilever 4. The first and second support portions 22 and 23 are formed such that lengths (widths) W in the second direction L2 are constant along the first direction L1.

In the cantilever 4, a doped layer 24 functioning as a piezoresistor is provided on the first and second support portions 22 and 23, and a portion of a region between the first and second support portions 22 and 23.

The doped layer 24 which is provided on a portion of each of the first and second support portions 22 and 23 forms a first displacement detection portion 25 and a second displacement detection portion 26. The doped layer 24 which is provided on a portion of the region between the first and second support portions 22 and 23 forms a connection portion 27 which connects the first and second displacement detection portions 25 and 26.

For example, the doped layer 24 is formed by doping a doping agent (impurities) such as phosphorus on the silicon active layer 2c of the SOI substrate 2 using various methods such as an ion implantation method or a diffusion method.

The first and second displacement detection portions 25 and 26 are partitioned to be adjacent to each other in a state of being separated from each other in the second direction L2 via the intra-lever gap 21. The first and second displacement detection portions 25 and 26 are formed such that lengths (widths) Wd in the second direction L2 are constant along the first direction L1.

The first and second displacement detection portions 25 and 26 are formed such that the lengths (widths) Wd in the second direction L2 are smaller than the lengths (widths) W of the first and second support portions 22 and 23 in the second direction L2.

The first and second displacement detection portions 25 and 26 include a first electrode end portion 25a and a second electrode end portion 26a which are electrically connected to a first electrode 14a and a second electrode 14b which are different from each other on the proximal end portion 4a side. That is, the first displacement detection portion 25 includes the first electrode end portion 25a which is electrically connected to the first electrode 14a, and the second displacement detection portion 26 includes the second electrode end portion 26a which is electrically connected to the second electrode 14b.

The first and second displacement detection portions 25 and 26 are electrically connected to each other via the connection portion 27 on the distal end portion 4b side.

The detection portion 6 includes the first and second displacement detection portions 25 and 26 which are provided on the cantilever 4.

According to the function as the piezoresistor due to the doped layer 24 provided on the cantilever 4, the first and second displacement detection portions 25 and 26 detect displacements according to the bending of the cantilever 4.

The piezoresistor is a resistance element in which an electrical resistance value is changed according to a bending amount (displacement amount) of the cantilever 4. The first and second displacement detection portions 25 and 26 are disposed so as to be paired in a state where the intra-lever gap 21 is interposed therebetween from both sides in the second direction L2, and are electrically connected to each other via the connection portion 27. Accordingly, if a predetermined voltage is applied to a portion between the first and second electrodes 14a and 14b through a detection circuit 30 described below, a current due to the applied voltage flows from one of the first and second displacement detection portions 25 and 26 toward the other so as to wrap around the intra-lever gap 21.

An electric resistance value R in a path (current path) P of the current can be described as a sum of an electric resistance value Ra on the doped layer 24 of the first displacement detection portion 25, an electric resistance value Rb on the doped layer 24 of the second displacement detection portion 26, and an electric resistance value Rc on the doped layer 24 of the connection portion 27 which connects the first and second displacement detection portions 25 and 26 so as to wrap around the intra-lever gap 21.

Since the electric resistance value R is changed according to the displacement (bending) of the cantilever 4 by the function as the piezoresistor due to the doped layer 24, the change of the electric resistance value R corresponds to the pressure difference generated between the inside and the outside of the cavity 10.

Figure 4:
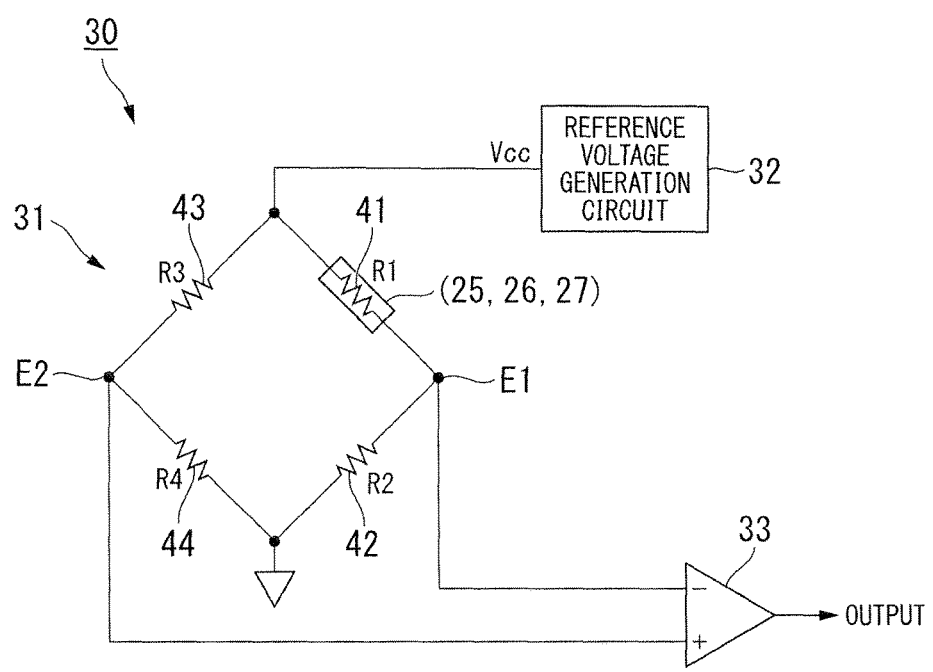
FIG. 4 is a configuration diagram of a detection circuit of the pressure sensor shown in FIG. 1.

The detection circuit 30 shown in FIG. 4 is connected to the first and second displacement detection portions 25 and 26 via the first and second electrodes 14a and 14b. The detection circuit 30 extracts the change of the electric resistance value R of the current path P, which is changed according to the displacement (bending) of the cantilever 4, as an electric output signal.

As shown in FIG. 4, the detection circuit 30 includes a bridge circuit 31, a reference voltage generation circuit 32, and a differential amplifier circuit 33.

For example, the bridge circuit 31 is a Wheatstone bridge circuit, and a branch side which is connected to first and second resistor portions 41 and 42 in series and a branch side which is connected to third and fourth resistor portions 43 and 44 in series are connected to the reference voltage generation circuit 32 in parallel.

The first resistor portion 41 is configured of the first displacement detection portion 25, the second displacement detection portion 26, and the connection portion 27 which are connected to each other in series between the first and second electrode end portions 25a and 26a. Accordingly, an electric resistance value R1 of the first resistor portion 41 is the electric resistance value R of the current path P. The second to fourth resistor portions 42 to 44 are fixed resistances, and include electric resistance values R2 to R4.

In the bridge circuit 31, a connection point E1 between the first and second resistor portions 41 and 42 is connected to an inverted input terminal of the differential amplifier circuit 33. In addition, a connection point E2 between the third and fourth resistor portions 43 and 44 is connected to a non-inverted input terminal of the differential amplifier circuit 33.

The reference voltage generation circuit 32 applies a predetermined reference voltage Vcc to a portion between the connection point of the first and third resistor portions 41 and 43 of the bridge circuit 31 and the connection portion of the second and fourth resistor portions 42 and 44.

The differential amplifier circuit 33 detects a potential difference between the two connection portions E1 and E2 of the bridge circuit 31, amplifies the potential difference at a predetermined amplification factor, and outputs the amplified potential difference. The potential difference becomes a value corresponding to the change of the electric resistance value R of the current path P.

Hereinafter, the operation of the pressure sensor 1 in a case where minute variation in pressures is applied to the above-described pressure sensor 1 is described with reference to FIGS. 5 and 6.

Figure 5:
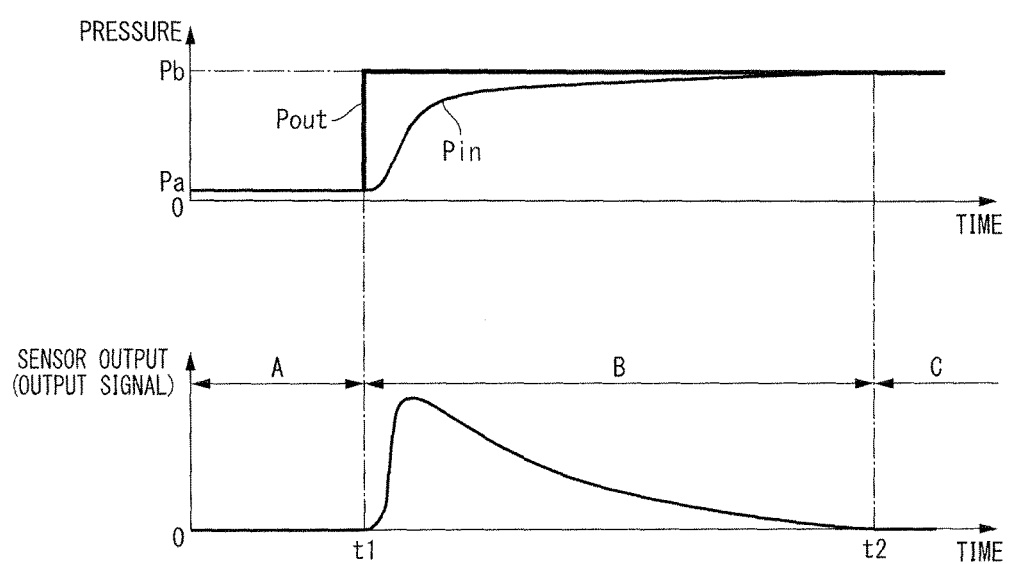
FIG. 5 is a diagram showing an example of an output signal of the pressure sensor shown in FIG. 1, and is a diagram showing a sensor output corresponding to an example of a correspondence relationship between an external atmospheric pressure and an internal atmospheric pressure.
Figure 6:
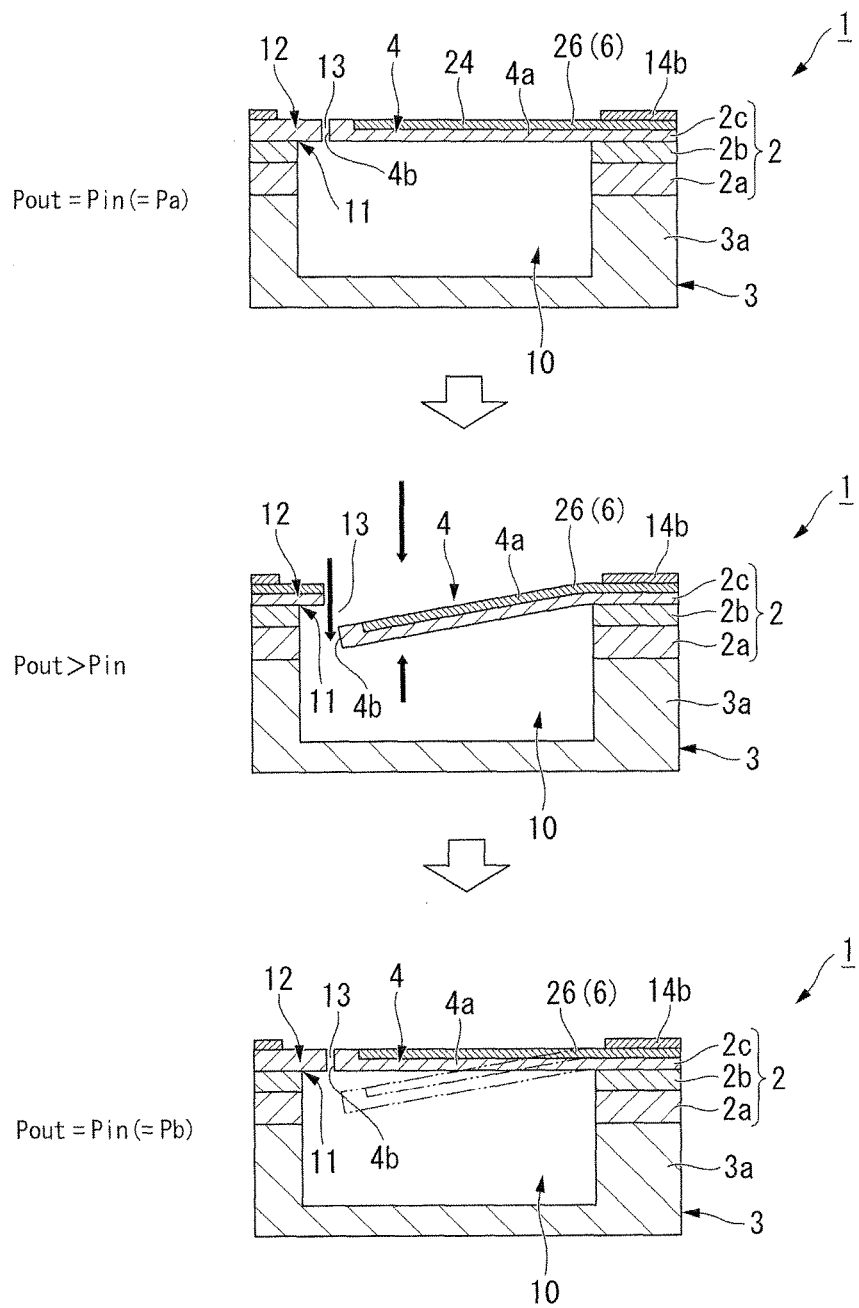
FIG. 6 is a view showing an example of an operation of the pressure sensor shown in FIG. 1 using the sectional view taken along line A-A shown in FIG. 1, and is a view showing three states, that is, a state where the external atmospheric pressure is the same as the internal atmospheric pressure, a state where the external atmospheric pressure is higher than the internal atmospheric pressure, and a state where the external atmospheric pressure and the internal atmospheric pressure have equilibrated with each other, in a case in which the state has shifted from the state of being the same to the equilibrated state via the state where the external atmospheric pressure is higher than the internal atmospheric pressure.

First, like a period A before a time t1 shown in FIG. 5, in a case where a pressure difference between a pressure Pout (predetermined first pressure Pa) outside the cavity 10 and a pressure Pin inside the cavity 10 is zero, the cantilever 4 is not bent as shown in the upper drawing of FIG. 6. Accordingly, an output signal (sensor output) output from the detection circuit 30 is a predetermined value (for example, zero).

In addition, like a period B after the time t1 shown in FIG. 5, if the pressure Pout outside the cavity increases, since the pressure difference is generated between the inside and the outside of the cavity 10, the cantilever 4 is bent toward the inside of the cavity 10 as shown in the intermediate drawing of FIG. 6. Accordingly, since distortion is generated in the first and second displacement detection portions 25 and 26 functioning as the piezoresistor according to the bending of the cantilever 4 and the electric resistance value R of the current path P is changed, the sensor output increases.

In addition, after the increase in the pressure Pout outside the cavity, the pressure transmission medium flows from the outside of the cavity 10 toward the inside thereof via the gap 13. Accordingly, the pressure Pin inside the cavity increases at a response which is more gently relative to the variation in the pressure Pout outside the cavity while being slower than the pressure Pout outside the cavity with the lapse of time. As a result, since the pressure Pin inside the cavity gradually approaches the pressure Pout outside the cavity, the pressure inside the cavity 10 and the pressure outside the cavity 10 are equilibrated, the bending of the cantilever 4 gradually decreases, and the sensor output gradually decreases.

In addition, like a period C after a time t2 shown in FIG. 5, if the pressure Pin inside the cavity and the pressure Pout (predetermined second pressure Pb) outside the cavity are the same as each other, as shown in the lower drawing of FIG. 6, the bending of the cantilever 4 according to the pressure difference is released such that the shape of the cantilever 4 is returned to the original shape, and the sensor output becomes a predetermined value (for example, zero) again.

As described above, according to the pressure sensor 1 of the present embodiment, the lengths Wd of the first and second displacement detection portions 25 and 26 in the second direction L2 are shorter than the lengths W of the first and second support portions 22 and 23 in the second direction L2. Accordingly, compared to a case where the lengths (widths) of the first and second displacement detection portions 25 and 26 in the width direction (second direction L2) are the same as the lengths (widths) of the first and second support portions 22 and 23, it is possible to increase the electric resistance values Ra and Rb of the first and second displacement detection portions 25 and 26. Therefore, it is possible to decrease a current, that is, power consumption in a case where a predetermined voltage is applied to the current path P through the detection circuit 30.

Moreover, since the intra-lever gap 21 by which the first and second displacement detection portions 25 and 26 are partitioned in the second direction L2 (that is, width direction) is provided, there is a reduced occurrence of leaks between the first and second displacement detection portions 25 and 26, and it is possible to improve detection accuracy.

First Modification Example of First Embodiment

In the above-described first embodiment, the first and second displacement detection portions 25 and 26 are formed such that the lengths (widths) Wd in the second direction L2 are constant along the first direction L1. However, the present invention is not limited to this. The first and second displacement detection portions 25 and 26 may be formed such that the electric resistance value of the portion on the proximal end portion 4a side is larger than the electric resistance value of the portion on the distal end portion 4b side in the first direction L1.

Figure 7:
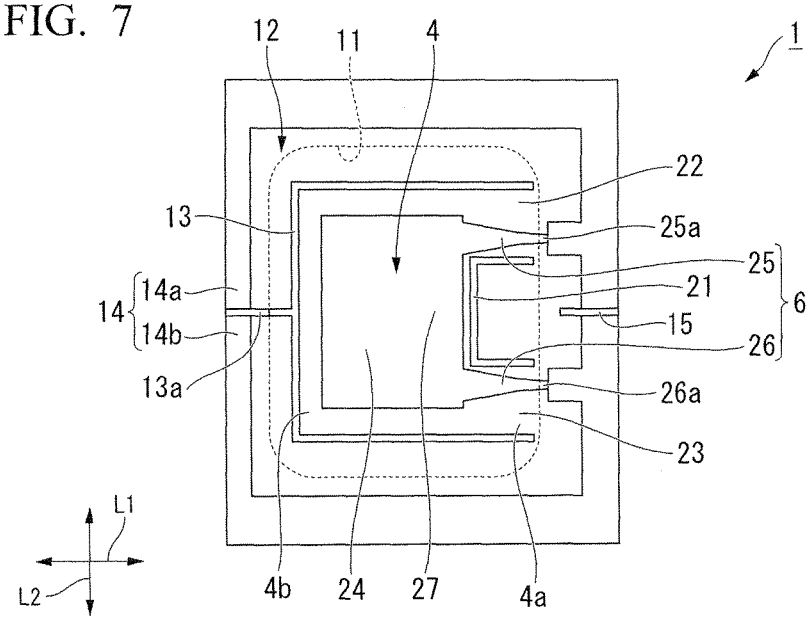
FIG. 7 is a plan view showing a configuration of a pressure sensor according to a first modification example of the first embodiment of the present invention.

In the pressure sensor 1 according to a first modification example, as shown in FIG. 7, the first and second displacement detection portion 25 and 26 are changed such that the lengths (widths) in the second direction L2 decrease from the connection portion 27 toward the first and second electrode end portions 25a and 26a.

According to the first modification example, in the first and second displacement detection portions 25 and 26, it is possible to increase the electric resistance value of the portion on the proximal end portion 4a side having larger stress concentration than that of the portion on the distal end portion 4b side. Accordingly, it is possible to improve detection sensitivity, and it is possible to decrease a current, that is, power consumption in a case where a predetermined voltage is applied to the current path P through the detection circuit 30.

In addition, according to contrivance with respect to the shapes of the first and second displacement detection portions 25 and 26, the first modification example shows an example in which the electric resistance value of the portion on the proximal end portion 4a side is larger than the electric resistance value of the portion on the distal end portion 4b side. However, the present invention is not limited to this case.

For example, the electric resistance value of the portion on the proximal end portion 4a side may be larger than the electric resistance value of the portion on the distal end portion 4b side by changing the thicknesses of the first and second displacement detection portions 25 and 26 or by changing a doping density of a doping agent from the connection portion 27 toward the first and second electrode end portions 25a and 26a.

Second Modification Example of First Embodiment

In the above-described first embodiment, the first and second displacement detection portions 25 and 26 are formed such that the lengths (widths) Wd in the second direction L2 are constant along the first direction L1. However, the present invention is not limited to this. Each of the first and second displacement detection portions 25 and 26 may have a shape in which generated heat is dispersed while the electric resistance value increases.

Figure 8:
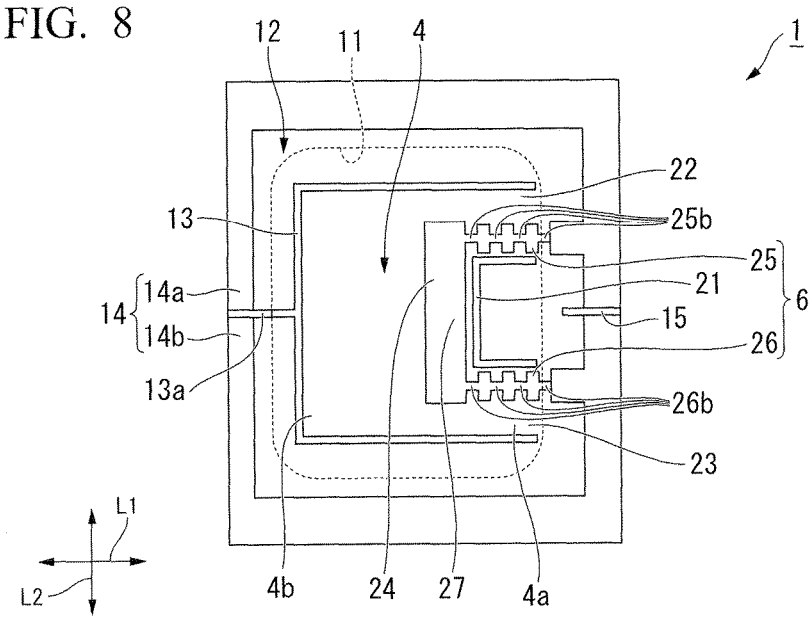
FIG. 8 is a plan view showing a configuration of a pressure sensor according to a second modification example of the first embodiment of the present invention.

In the pressure sensor 1 according to a second modification example, as shown in FIG. 8, in the first and second displacement detection portions 25 and 26, narrow width portions 25b and 26b in which lengths (widths) in the second direction L2 are short (narrow) are intermittently disposed along the first direction L1.

According to the second modification example, it is possible to increase the electric resistance values of the first and second displacement detection portions 25 and 26 by providing the narrow width portions 25b and 26b. Accordingly, it is possible to decrease a current, that is, power consumption in a case where a predetermined voltage is applied to the current path P through the detection circuit 30. Moreover, since the plurality of narrow width portions 25b and 26b are intermittently disposed along the first direction L1, it is possible to prevent heat generated due to increases of the electric resistance values from being concentrated at a portion, and it is possible to disperse the generated heat.

Third Modification Example of First Embodiment

In the above-described first embodiment, the first displacement detection portion 25 is formed by the doped layer 24 which is provided on the first support portion 22, and the second displacement detection portion 26 is formed by the doped layer 24 which is provided on the second support portion 23. However, the present invention is not limited to this.

Figure 9:
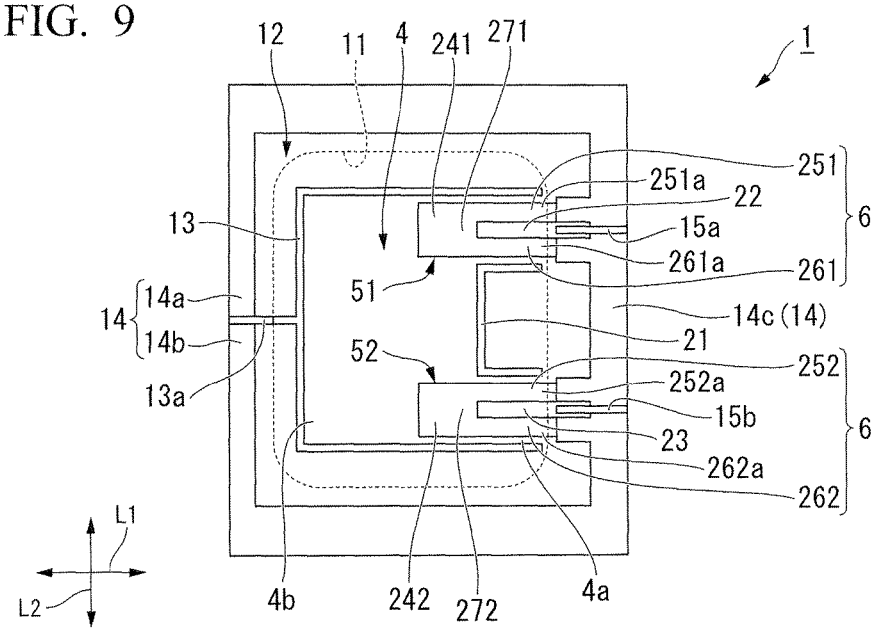
FIG. 9 is a plan view showing a configuration of a pressure sensor according to a third modification example of the first embodiment of the present invention.

As shown in FIG. 9, the pressure sensor 1 according to a third modification example includes doped layers 241 and 242 which are provided independently from each of the first and second support portions 22 and 23, a first detection portion 51 which is formed on the first support portion 22, and a second detection portion 52 which is formed on the second support portion 23.

The first detection portion 51 includes a first displacement detection portion 251 and a second displacement detection portion 261 which are formed by the doped layer 241 provided on the first support portion 22. The first and second displacement detection portions 251 and 261 are partitioned so as to be adjacent in a state being separated from each other in the second direction L2 via the silicon active layer 2c which does not have the doped layer 241, that is, the silicon active layer 2c which is exposed in a state where the doped layer 241 is not formed.

The first and second displacement detection portions 251 and 261 include first and second electrode end portions 251a and 261a which are electrically connected to the first electrode 14a and a short-circuit electrode 14c which are different from each other on the proximal end portion 4a side. That is, the first displacement detection portion 251 includes the first electrode end portion 251a which is electrically connected to the first electrode 14a, and the second displacement detection portion 261 includes the second electrode end portion 261a which is electrically connected to the short-circuit electrode 14c.

The first and second displacement detection portions 251 and 261 are electrically connected to each other via a connection portion 271 on the distal end portion 4b side.

The second detection portion 52 includes a first displacement detection portion 252 and a second displacement detection portion 262 which are formed by the doped layer 242 provided on the second support portion 23. The first and second displacement detection portions 252 and 262 are partitioned so as to be adjacent in a state being separated from each other in the second direction L2 via the silicon active layer 2c which does not have the doped layer 242, that is, the silicon active layer 2c which is exposed in a state where the doped layer 242 is not formed.

The first and second displacement detection portions 252 and 262 include first and second electrode end portions 252a and 262a which are electrically connected to the short-circuit electrode 14c and the second electrode 14b which are different from each other on the proximal end portion 4a side. That is, the first displacement detection portion 252 includes the first electrode end portion 252a which is electrically connected to the short-circuit electrode 14c, and the second displacement detection portion 262 includes the second electrode end portion 262a which is electrically connected to the second electrode 14b.

The first and second displacement detection portions 252 and 262 are electrically connected to each other via a connection portion 272 on the distal end portion 4b side.

In the pressure sensor 1 of the third modification example, the electrode 14 is electrically separated into three electrodes, that is, the first electrode 14a, the second electrode 14b, and the short-circuit electrode 14c by three gaps penetrating the silicon active layer 2c of the SOI substrate 2. For example, the three gaps are the branch gap 13a which is formed so as to be branched from the gap 13, and first and second inter-electrode gaps 15a and 15b which are independent from the gap 13.

The first electrode end portion 251a of the first detection portion 51 is connected to the first electrode 14a, and the second electrode end portion 261a of the first detection portion 51 is connected to the short-circuit electrode 14c. In addition, the first electrode end portion 252a of the second detection portion 52 is connected to the short-circuit electrode 14c, and the second electrode end portion 262a of the second detection portion 52 is connected to the second electrode 14b. That is, the second electrode end portion 261a of the first detection portion 51 and the first electrode end portion 252a of the second detection portion 52 are electrically connected via the short-circuit electrode 14c.

The first and second displacement detection portions 251 and 261 of the first detection portion 51 are electrically connected to each other via the connection portion 271 which is formed by the doped layer 241 which is provided on a portion closer to the distal end portion 4b side relative to the first support portion 22. In addition, the first and second displacement detection portions 252 and 262 of the second detection portion 52 are electrically connected to each other via the connection portion 272 which is formed by the doped layer 242 which is provided on a portion closer to the distal end portion 4b side relative to the second support portion 23.

Accordingly, if a predetermined voltage is applied to a portion between the first and second electrodes 14a and 14b through the detection circuit 30, a current due to the applied voltage flows from the first displacement detection portion 251 of the first detection portion 51, the connection portion 271, and the second displacement detection portion 261 toward the first displacement detection portion 252 of the second detection portion 52, the connection portion 272, and the second displacement detection portion 262 via the short-circuit electrode 14c. The electric resistance value of the path (current path) of the current can be described as a sum of electric resistance values Ra, Rb, and Rc of the first detection portion 51, and electric resistance values Ra, Rb, and Rc of the second detection portion 52.

According to the third modification example, since the first and second displacement detection portions 251 and 261 are provided in the first support portion 22 and the first and second displacement detection portions 252 and 262 are provided in the second support portion 23, it is possible to increase the electric resistance value of the current path. Accordingly, it is possible to improve detection sensitivity and decrease power consumption.

In addition, each of the first and second detection portions 51 and 52 is configured by the doped layers 241 and 242 which are provided independently from each of the first and second support portions 22 and 23, and the first and second detection portions 51 and 52 are connected to each other via the short-circuit electrode 14c.

Accordingly, for example, a doped layer for connecting the first and second detection portions 51 and 52 while bypassing the intra-lever gap 21 between the first and second support portions 22 and 23 is not required. Accordingly, it is possible to increase a ratio of the electric resistance values (that is, the electric resistance values of the first and second displacement detection portions 25 and 26) effective for detecting the bending of the cantilever 4 in the electric resistance values of the current path, and it is possible to improve detection sensitivity.

Fourth Modification Example of First Embodiment

Figure 10:
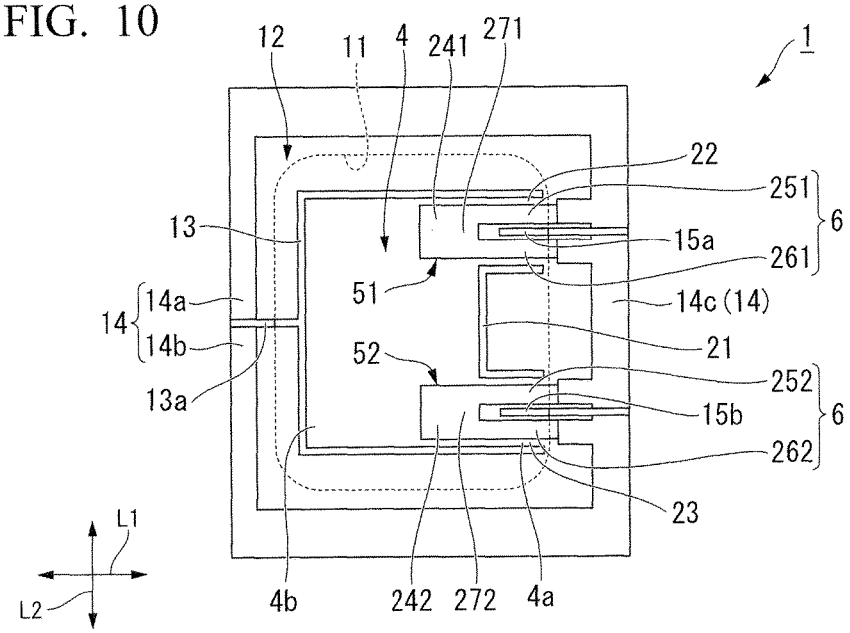
FIG. 10 is a plan view showing a configuration of a pressure sensor according to a fourth modification example of the first embodiment of the present invention.

As the pressure sensor 1 according to a fourth modification example shown in FIG. 10, in the above-described third modification example, the first and second displacement detection portions 251 and 261 may be electrically separated from each other in the second direction L2 in the first detection portion 51 by the first inter-electrode gap 15a.

In addition, the first and second displacement detection portions 252 and 262 may be electrically separated from each other in the second direction L2 in the second detection portion 52 by the second inter-electrode gap 15b. For example, the first and second inter-electrode gaps 15a and 15b extend toward the distal end portion 4b side of the cantilever 4 along the first direction L1.

In the pressure sensor 1 according to the fourth modification example, in a region in which the first and second inter-electrode gaps 15a and 15b communicate with the inside of the cavity 10, the first and second inter-electrode gaps 15a and 15b are disposed to configure a portion of the communication opening 11 (or to be included in the communication opening 11) which is formed by the sensor main body 3, the silicon support layer 2a, and the oxide layer 2b.

According to the fourth modification example, since the first and second inter-electrode gaps 15a and 15b are provided, there is a reduced occurrence of leaks between the first and second displacement detection portions 251 and 261 of the first detection portion 51, there is a reduced occurrence of leaks between the first and second displacement detection portions 252 and 262 of the second detection portion 52, and it is possible to improve detection accuracy.

Fifth Modification Example of First Embodiment

Figure 11:
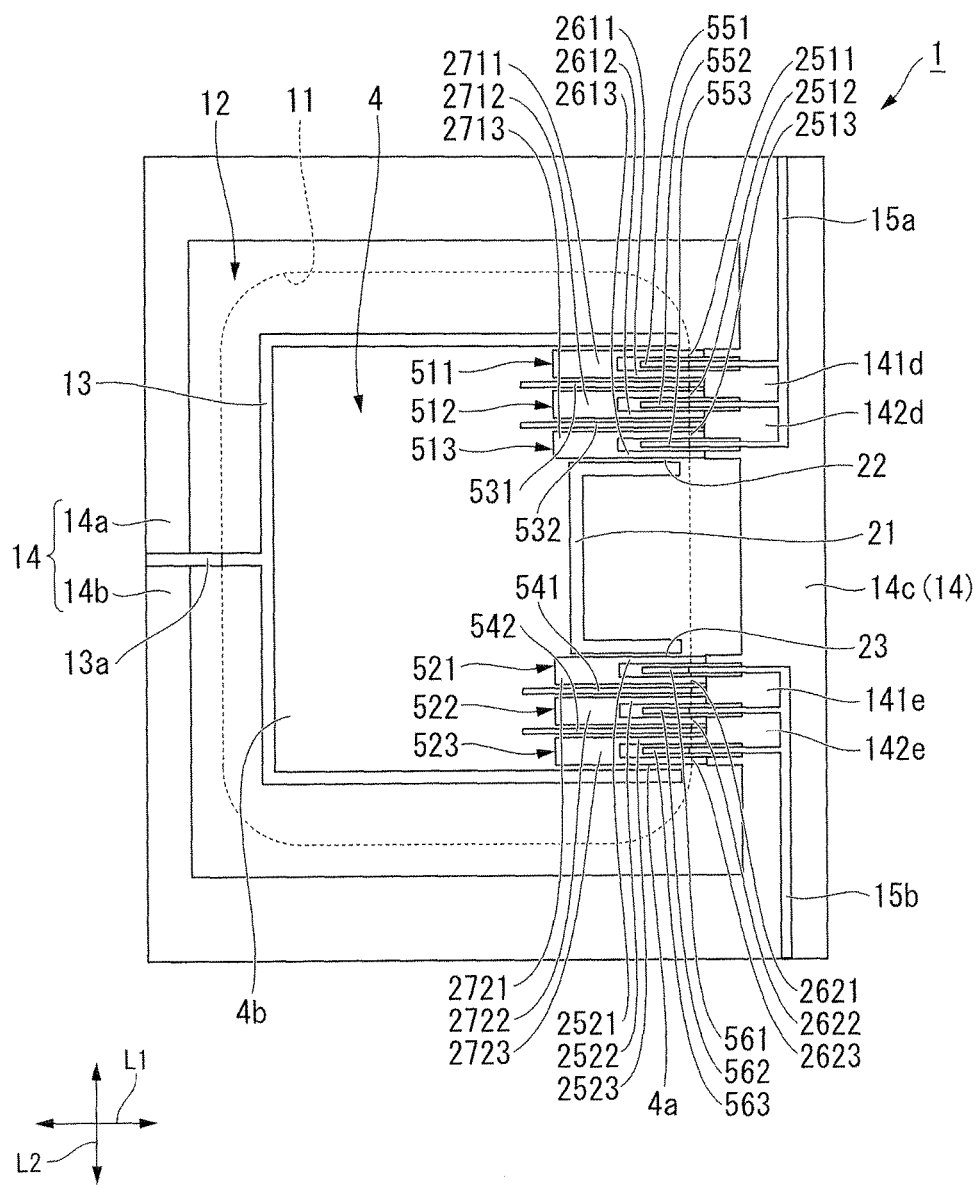
FIG. 11 is a plan view showing a configuration of a pressure sensor according to a fifth modification example of the first embodiment of the present invention.

As the pressure sensor 1 according to a fifth modification example shown in FIG. 11, in the above-described third modification example, a plurality of first detection portions 51 (for example, three first detection portions 511, 512, and 513) which are electrically connected to each other in series in the first support portion 22, and a plurality of second detection portions 52 (for example, three second detection portions 521, 522, and 523) which are electrically connected to each other in series in the second support portion 23 may be provided.

In the pressure sensor 1 according to the fifth modification example, in the first support portion 22, the three first detection portions 511, 512, and 513 are arranged in the second direction L2 via two first gaps 531 and 532.

Moreover, for example, first and second displacement detection portions 2511 and 2611 of the first detection portion 511 are electrically separated from each other in the second direction L2 by a first branch gap 551 which is branched from the first inter-electrode gap 15a, and are electrically connected to each other via a connection portion 2711 on the distal end portion 4b side.

For example, first and second displacement detection portions 2512 and 2612 of the first detection portion 512 are electrically separated from each other in the second direction L2 by a first branch gap 552 which is branched from the first inter-electrode gap 15a, and are electrically connected to each other via a connection portion 2712 on the distal end portion 4b side.

For example, first and second displacement detection portions 2513 and 2613 of the first detection portion 513 are electrically separated from each other in the second direction L2 by a first branch gap 553 which is branched from the first inter-electrode gap 15a, and are electrically connected to each other via a connection portion 2713 on the distal end portion 4b side.

In addition, the second displacement detection portion 2611 of the first detection portion 511 and the first displacement detection portion 2512 of the first detection portion 512 which are adjacent to each other in the second direction L2 are electrically connected to each other by a short-circuit electrode 141d which is provided between the first branch gaps 551 and 552 adjacent to each other in the second direction L2.

The second displacement detection portion 2612 of the first detection portion 512 and the first displacement detection portion 2513 of the first detection portion 513 which are adjacent to each other in the second direction L2 are electrically connected to each other by a short-circuit electrode 142d which is provided between the first branch gaps 552 and 553 adjacent to each other in the second direction L2.

In addition, in the second support portion 23, three second detection portions 521, 522, and 523 are arranged in the second direction L2 via two second gaps 541 and 542. For example, first and second displacement detection portions 2521 and 2621 of the second detection portion 521 are electrically separated from each other in the second direction L2 by a second branch gap 561 which is branched from the second inter-electrode gap 15b, and are electrically connected to each other via a connection portion 2721 on the distal end portion 4b side.

For example, first and second displacement detection portions 2522 and 2622 of the second detection portion 522 are electrically separated from each other in the second direction L2 by a second branch gap 562 which is branched from the second inter-electrode gap 15b, and are electrically connected to each other via a connection portion 2722 on the distal end portion 4b side.

For example, first and second displacement detection portions 2523 and 2623 of the second detection portion 523 are electrically separated from each other in the second direction L2 by a second branch gap 563 which is branched from the second inter-electrode gap 15b, and are electrically connected to each other via a connection portion 2723 on the distal end portion 4b side.

In addition, the second displacement detection portion 2621 of the second detection portion 521 and the first displacement detection portion 2522 of the second detection portion 522 which are adjacent to each other in the second direction L2 are electrically connected to each other by a short-circuit electrode 141e which is provided between the second branch gaps 561 and 562 adjacent to each other in the second direction L2.

The second displacement detection portion 2622 of the second detection portion 522 and the first displacement detection portion 2523 of the second detection portion 523 which are adjacent to each other in the second direction L2 are electrically connected to each other by a short-circuit electrode 142e which is provided between the second branch gaps 562 and 563 adjacent to each other in the second direction L2.

In addition, the first gaps 531 and 532, the second gaps 541 and 542, the first branch gaps 551 to 553, and the second branch gaps 561 to 563 are through-holes which penetrate the silicon active layer 2c of the SOI substrate 2. In a region in which the gaps communicate with the inside of the cavity 10, the gaps are disposed to configure a portion of the communication opening 11 (or to be included in the communication opening 11).

The first displacement detection portion 2511 of the first detection portion 511 and the second displacement detection portion 2623 of the second detection portion 523 which are positioned on both ends in the second direction L2 are connected to each other by the first and second electrodes 14a and 14b. In addition, the second displacement detection portion 2613 of the first detection portion 513 and the first displacement detection portion 2521 of the second detection portion 521, which are separated from the intra-lever gap 21 and are adjacent in the second direction L2, are connected to the short-circuit electrode 14c.

Accordingly, a predetermined voltage is applied to a portion between the first and second electrodes 14a and 14b through the detection circuit 30, and a current due to the applied voltage sequentially flows from the first detection portions 511, 512, and 513 toward the second detection portions 521, 522, and 523 via the short-circuit electrode 14c.

The electric resistance values of the path (current path) of the current can be described as a sum of the electric resistance values Ra, Rb, and Rc of the three first detection portions 511, 512, and 513 and the electric resistance values Ra, Rb, and Rc of the three second detection portions 521, 522, and 523.

According to the fifth modification example, since the plurality of first detection portions 51 (for example, three first detection portions 511, 512, and 513) are provided in the first support portion 22 and the plurality of second detection portions 52 (for example, three second detection portions 521, 522, and 523) are provided in the second support portion 23, it is possible to increase the electric resistance values of the current path. Accordingly, it is possible to improve detection sensitivity and decrease power consumption.

Sixth Modification Example of First Embodiment

Figure 12:
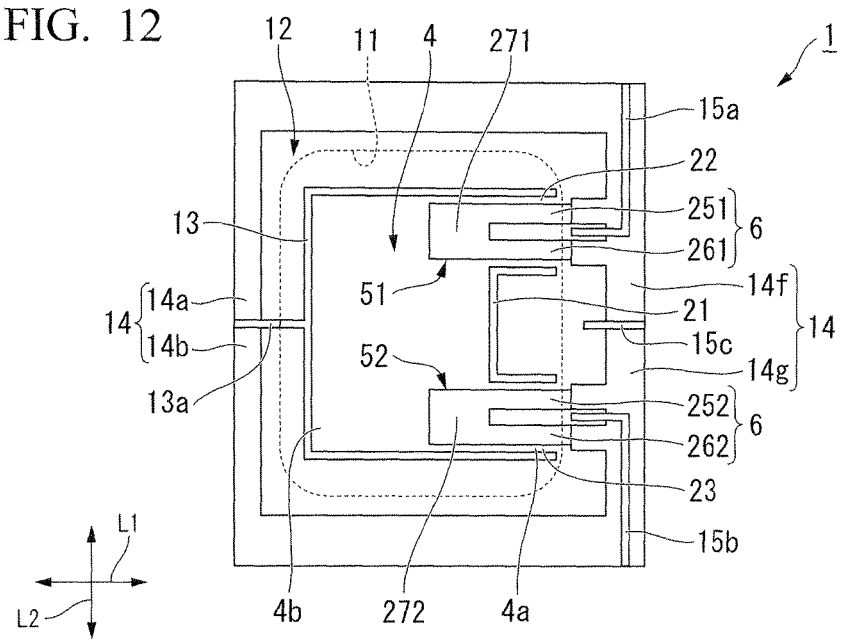
FIG. 12 is a plan view showing a configuration of a pressure sensor according to a sixth modification example of the first embodiment of the present invention.

As the pressure sensor 1 according to a sixth modification example shown in FIG. 12, in the above-described third and fourth modification examples, the first and second displacement detection portions 251 and 261 of the first detection portion 51 and the first and second displacement detection portions 252 and 262 of the second detection portion 52 may be connected to four electrodes which are different from each other.

In the pressure sensor 1 of the sixth modification example, the electrode 14 is electrically separated into four electrodes, that is, the first and second electrodes 14a and 14b, and third and fourth electrodes 14f and 14g by four gaps penetrating the silicon active layer 2c of the 501 substrate 2.

For example, the four gaps are the branch gap 13a which is branched from the gap 13, and the first to third inter-electrode gaps 15a, 15b, and 15c which are independent from the gap 13.

Figure 13:
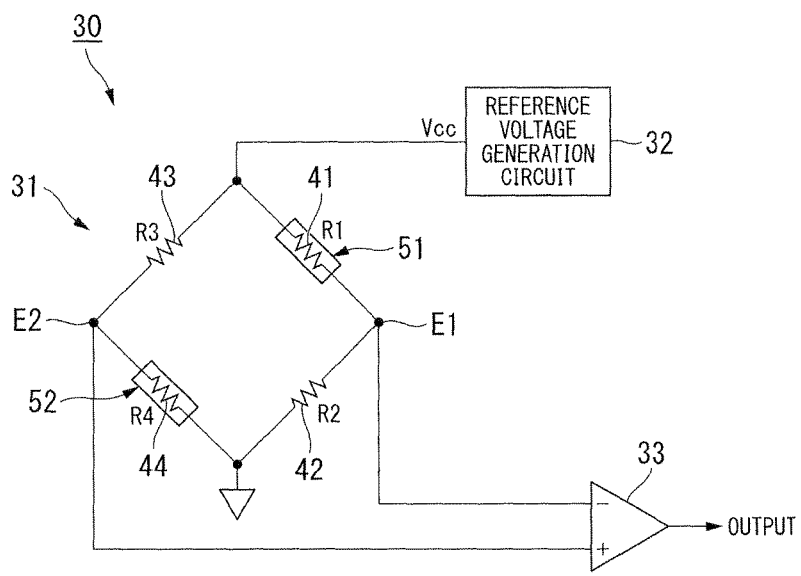
FIG. 13 is a configuration diagram of a detection circuit of a pressure sensor according to a sixth modification example of the first embodiment of the present invention.

In the pressure sensor 1 of the sixth modification example, as shown in FIG. 13, in the bridge circuit 31 of the detection circuit 30, the first resistor portion 41 is configured of the first displacement detection portion 251 of the first detection portion 51, the second displacement detection portion 261, and the connection portion 271. Accordingly, the electric resistance value R1 of the first resistor portion 41 is a sum of the electric resistances Ra, Rb, and Rc of the first detection portion 51.

In addition, the fourth resistor portion 44 is configured of the first displacement detection portion 252 of the second detection portion 52, the second displacement detection portion 262, and the connection portion 272. Accordingly, the electric resistance value R4 of the fourth resistor portion 44 is a sum of the electric resistances Ra, Rb, and Rc of the second detection portion 52. The second and third resistor portions 42 and 43 are fixed resistances, and include the electric resistance values R2 and R3.

According to the sixth modification example, the electric resistance value in each of the first and second detection portions 51 and 52 is changed according to the bending of the cantilever 4. If a change amount (that is, increase) of the electric resistance value of the first detection portion 51 is defined as a first change amount $\Delta R1$, since the first detection portion 51 is connected to a power source side (that is, the reference voltage generation circuit 32 side) of the bridge circuit 31, the voltage of the connection point E1 decreases according to the increase of the first change amount $\Delta R1$. If a change amount (that is, increase) of the electric resistance value of the second detection portion 52 is defined as a second change amount $\Delta R4$, since the second detection portion 52 is connected to a ground side of the bridge circuit 31, the voltage of the connection point E2 increases according to the increase of the second change amount $\Delta R4$.

Accordingly, a potential difference between the two connection points E1 and E2 of the bridge circuit 31 is a sum of the absolute values of the voltage changes of the two connection points E1 and E2. Therefore, as it were, it is possible to additionally detect the change of the electric resistance value of each of the first and second detection portions 51 and 52 according to bending of the cantilever 4, and it is possible to improve detection sensitivity.

Seventh Modification Example of First Embodiment

In the above-described sixth modification example, the second and third resistor portions 42 and 43 of the bridge circuit 31 are fixed resistances. However, the present invention is not limited to this. The second and third resistor portions 42 and 43 may be configured of a reference sensor 60 which is obtained by omitting the cavity 10 from the pressure sensor 1 according to the sixth modification example.

Figure 14:
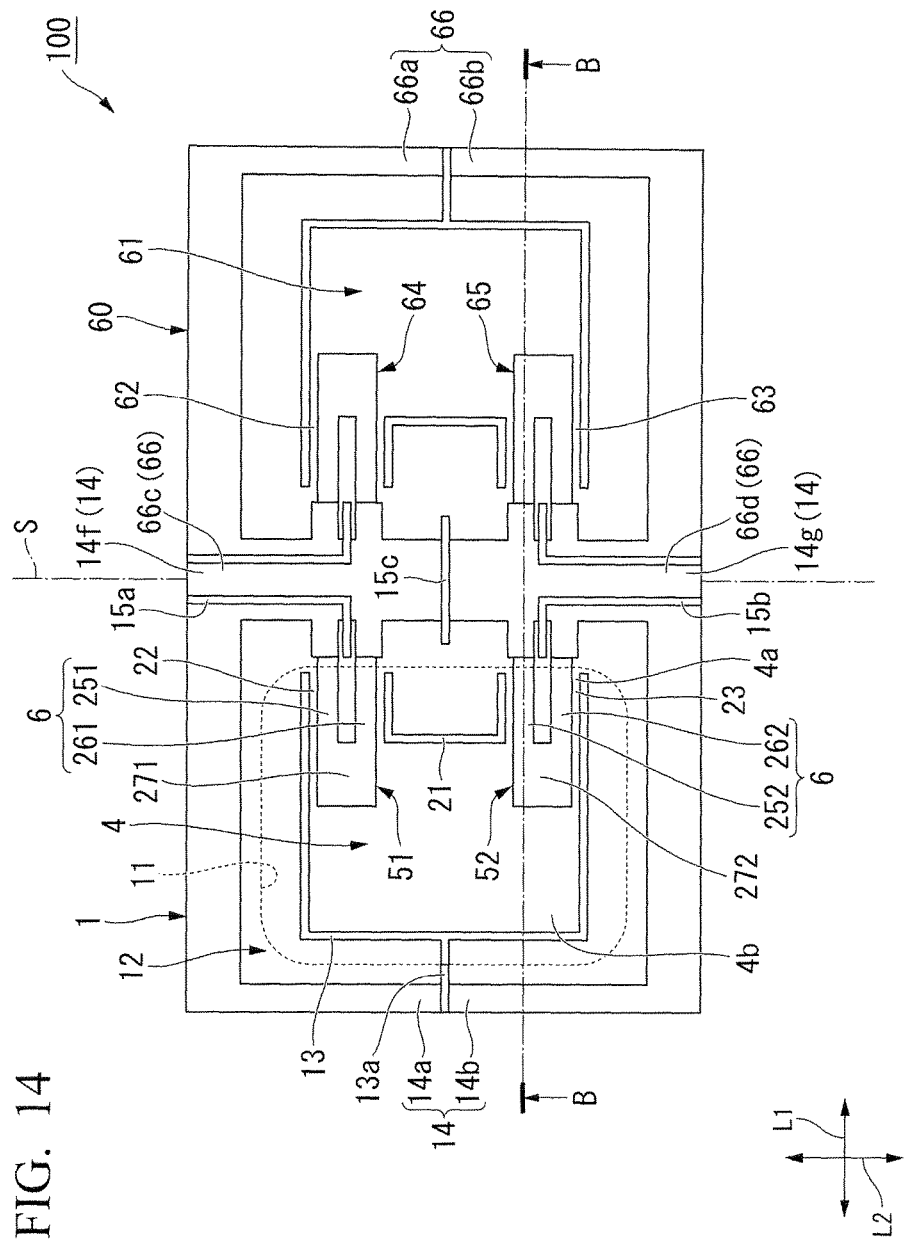
FIG. 14 is a plan view showing a configuration of a pressure sensor according to a seventh modification example of the first embodiment of the present invention.
Figure 15:
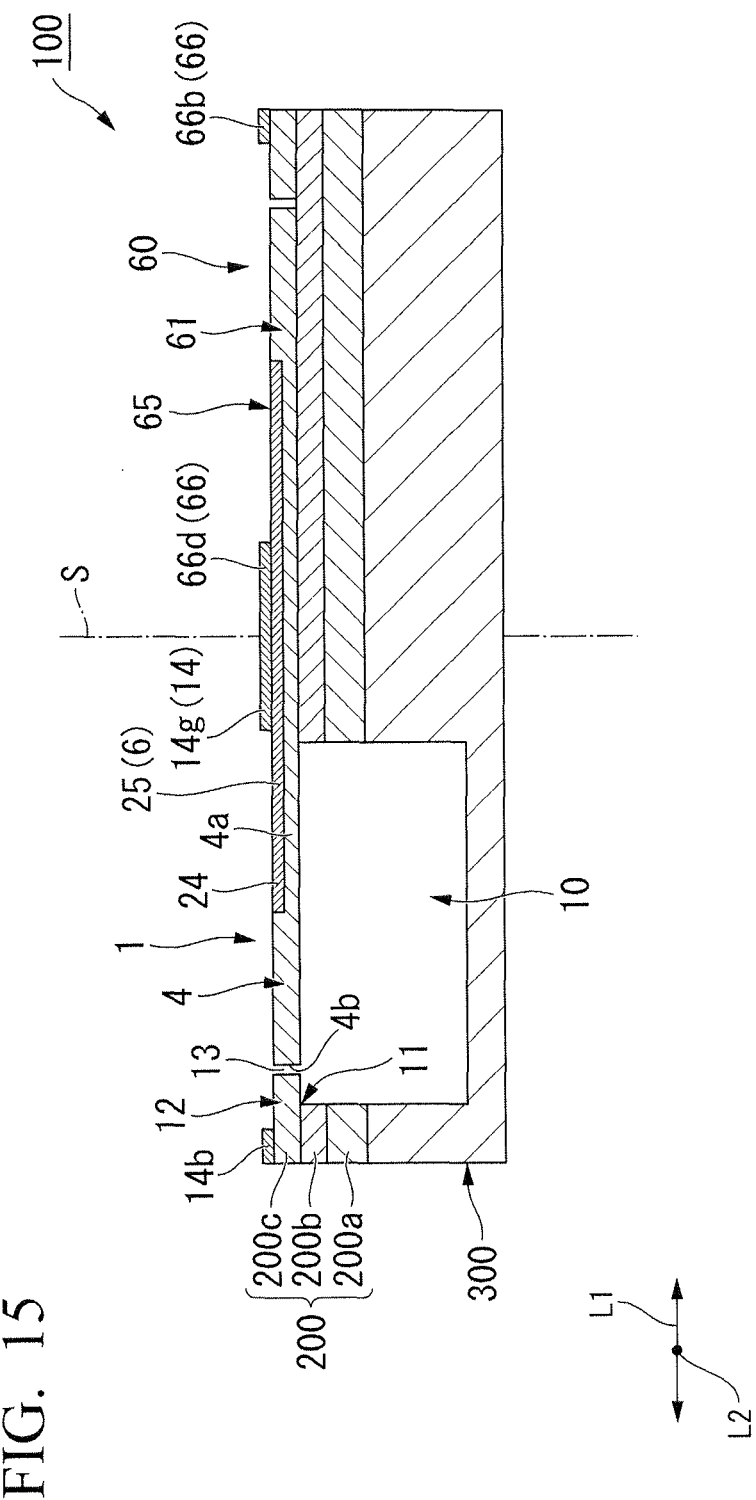
FIG. 15 is a sectional view of the pressure sensor taken along line B-B shown in FIG. 14.

As shown in FIGS. 14 and 15, a pressure sensor 100 according a seventh modification example includes the configuration portion corresponding to the pressure sensor 1 according to the above-described sixth modification example, and the reference sensor 60 corresponding to the configuration in which the cavity 10 is not formed in the pressure sensor 1 according to the sixth modification example.

In the pressure sensor 100, the configuration portion corresponding to the pressure sensor 1 according to the sixth modification example, and the reference sensor 60 are symmetrically disposed (for example, plane-symmetrically disposed with respect to a virtual reference surface S, or the like) and are integrally formed. The pressure sensor 100 is formed by a SOI substrate 200 and a sensor main body 300 which are integrally fixed to each other.

In addition, in the pressure sensor 100 according to the seventh modification example shown in FIGS. 14 and 15, reference numerals used in the pressure sensor 1 according to the sixth modification example are assigned to the configurations corresponding to those of the pressure sensor 1 according to the above-described sixth modification example for convenience. Reference numerals which are different from reference numerals used in the pressure sensor 1 according to the sixth modification example are assigned to the configurations of the reference sensor 60 for convenience.

The reference sensor 60 includes a lever portion 61 which has the same shape as that of the cantilever 4 and is configured of the silicon active layer 2c, and first and second shape portions 62 and 63 which have the same shapes as those of the first and second support portions 22 and 23 in the lever portion 61. In the first and second shape portions 62 and 63, the doped layer 24 which functions as a piezoresistor is provided, and first and second reference portions 64 and 65 having the same shapes as those of the first and second detection portions 51 and 52 are formed.

The reference sensor 60 includes a reference electrode 66 which has the same shape as that of the electrode 14. That is, the reference electrode 66 includes first and second reference electrodes 66a and 66b which have the same shapes as those of the first and second electrodes 14a and 14b. In addition, the reference electrode 66 includes third and fourth reference electrodes 66c and 66d which have the same shapes as those of the third and fourth electrodes 14f and 14g.

In addition, in a boundary formed by the virtual reference surface S between the configuration corresponding to the pressure sensor 1 according to the sixth modification example and the configuration of the reference sensor 60, the third electrode 14f and the third reference electrode 66c are connected to each other, and the fourth electrode 14g and the fourth reference electrode 66d are connected to each other.

Both end portions of the first reference portion 64 are connected to the first and third reference electrodes 66a and 66c. Both end portions of the second reference portion 65 are connected to the second and fourth reference electrodes 66b and 66d.

In the pressure sensor 100 of the seventh modification example, in the bridge circuit 31 of the detection circuit 30, the second resistor portion 42 is configured of the first reference portion 64 which is connected to the first detection portion 51 via the third electrode 14f and the third reference electrode 66c.

Accordingly, the electric resistance value R2 of the second resistor portion 42 is the same as a sum (that is, the electric resistance value R1 of the first resistor portion 41) of the electric resistance values Ra, Rb, and Rc of the first detection portion 51 in a state where the cantilever 4 is not bent.

The third resistor portion 43 is configured of the second reference portion 65 which is connected to the second detection portion 52 via the fourth electrode 14g and the fourth reference electrode 66d. Accordingly, the electric resistance value R3 of the third resistor portion 43 is the same as a sum (that is, the electric resistance value R4 of the fourth resistor portion 44) of the electric resistance values Ra, Rb, and Rc of the second detection portion 52 in a state where the cantilever 4 is not bent.

According to the seventh modification example, since the reference sensor 60 is provided, changes of parasitic capacitance and wiring capacity in the pressure sensor 1 or the like, and sensitivity changes due to environmental changes such as temperature changes can cancel out each other, and it is possible to accurately perform the detection with respect to the variation in pressures.

Eighth Modification Example of First Embodiment

In the above-described seventh modification example, the third and fourth reference electrodes 66c and 66d are connected to the third and fourth electrodes 14f and 14g. However, the present invention is not limited to this.

Figure 16:
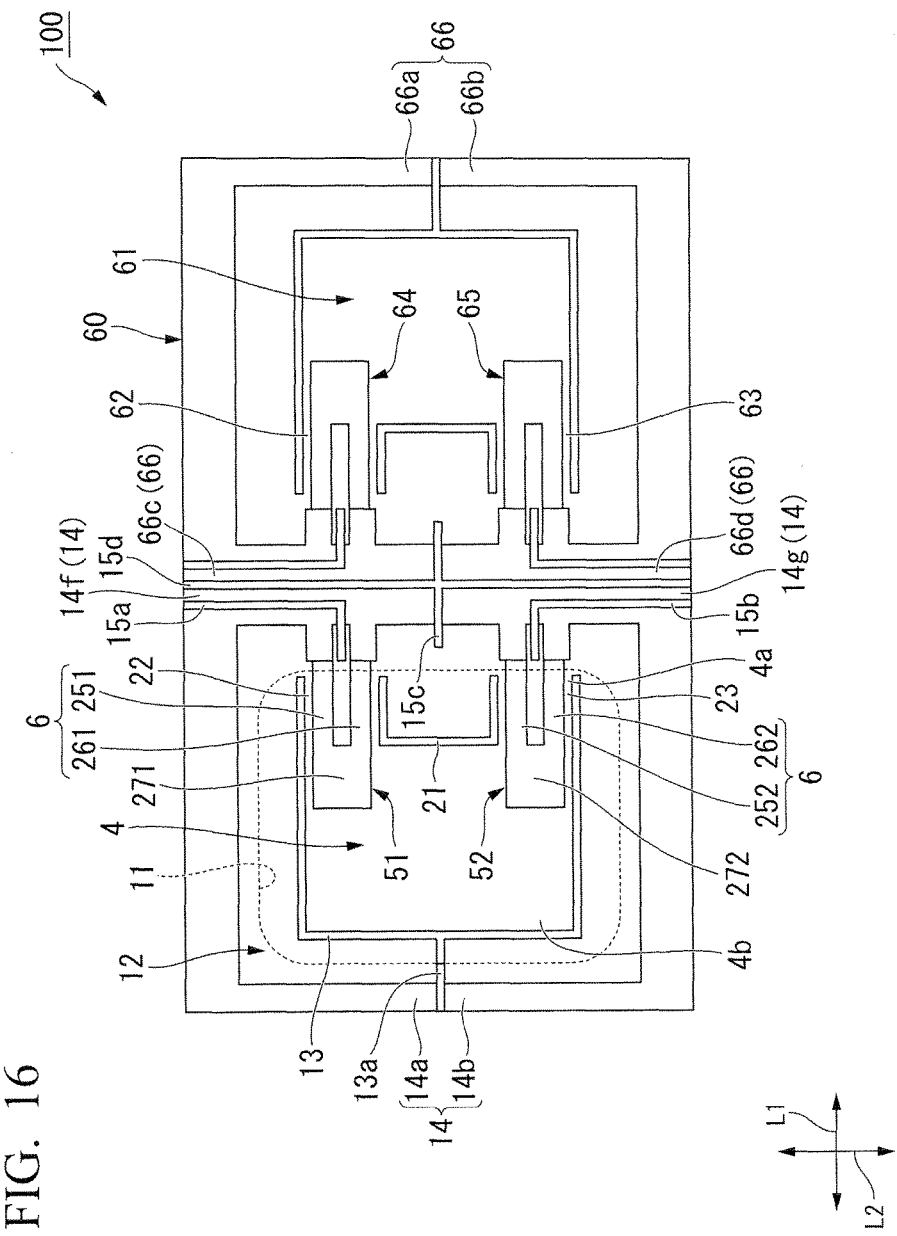
FIG. 16 is a plan view showing a configuration of a pressure sensor according to an eighth modification example of the first embodiment of the present invention.

As shown in FIG. 16, the pressure sensor 1 according to an eighth modification example includes a fourth inter-electrode gap 15d which penetrates the silicon active layer 2c between the third and fourth electrodes 14f and 14g and the third and fourth reference electrodes 66c and 66d. The third electrode 14f and the third reference electrode 66c are electrically separated from each other by the fourth inter-electrode gap 15d, and the fourth electrode 14g and the fourth reference electrode 66d are electrically separated from each other by the fourth inter-electrode gap 15d.

Ninth Modification Example of First Embodiment

In addition, in the above-described each embodiment, a wiring portion configured of a conductive material such as Au may be provided on the surface of the connection portion 27 which connects the first and second displacement detection portions 25 and 26 in the cantilever 4.

According to a ninth modification example, by providing the wiring portion, it is possible to decrease the electric resistance value Rc of the region in which the first and second displacement detection portions 25 and 26 are connected to each other. Accordingly, it is possible to increase the electric resistance values Ra and Rb of the first and second displacement detection portions 25 and 26, which have larger stress concentration than that of the region in which the first and second displacement detection portions 25 and 26 are connected to each other, relative to the electric resistance value R of the current path P.

Therefore, it is possible to improve detection sensitivity with respect to the changes of the electric resistance values Ra and Rb of the first and second displacement detection portions 25 and 26, and it is possible to accurately detect variation in pressures.

Second Embodiment

Next, a second embodiment of the pressure sensor according to the present invention is described with reference to the drawings. In addition, in the second embodiment, the same reference numerals are assigned to the same portions as the components of the first embodiment, and descriptions thereof are omitted.

Figure 17:
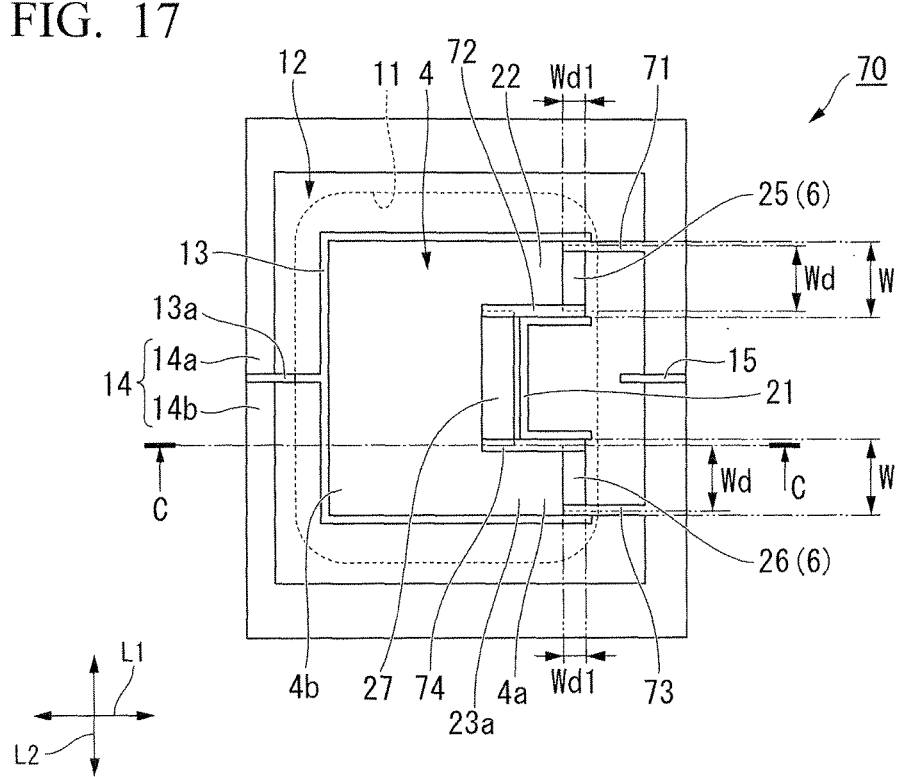
FIG. 17 is a plan view showing a configuration of a pressure sensor according to a second embodiment of the present invention.
Figure 18:
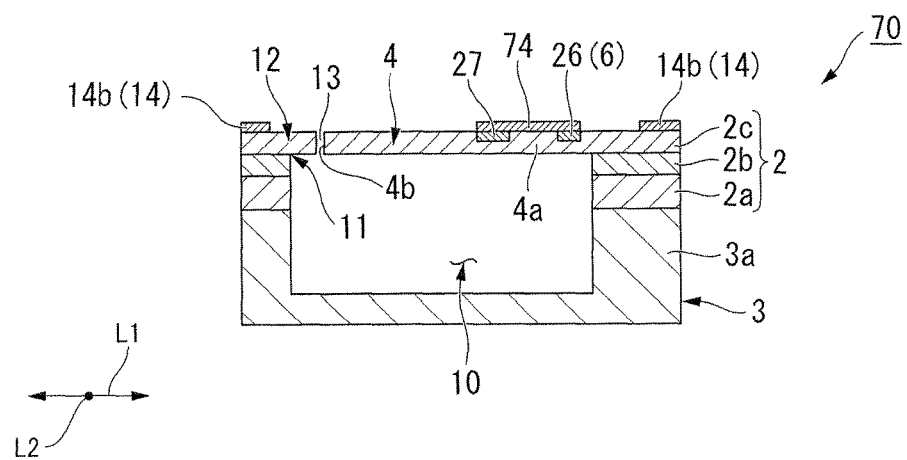
FIG. 18 is a sectional view of the pressure sensor taken along line C-C shown in FIG. 17.

As shown FIGS. 17 and 18, in a pressure sensor 70 of the present embodiment, the first displacement detection portion 25 and the second displacement detection portion 26 are formed to extend so as to be longer in the second direction L2 relative to the first direction L1.

The first displacement detection portion 25 is formed such that a length Wd1 along the first direction L1 is shorter than the length Wd along the second direction L2, and is disposed to be close to the proximal end portion 4a of the first support portion 22.

In addition, in this case, the length Wd of the first displacement detection portion 25 in the second direction L2 is shorter than the length W of the first support portion 22 in the second direction L2.

Similarly, the second displacement detection portion 26 is formed such that the length Wd1 along the first direction L1 is shorter than the length Wd along the second direction L2, and is disposed to be close to the proximal end portion 4a of the second support portion 23.

In addition, in this case, the length Wd of the second displacement detection portion 26 in the second direction L2 is shorter than the length W of the second support portion 23 in the second direction L2.

The first displacement detection portion 25 is electrically connected to the first electrode 14a via a first connection electrode 71 which is disposed between the first displacement detection portion 25 and the gap 13, and is electrically connected to the connection portion 27 via a second connection electrode 72 which is disposed between the first displacement detection portion 25 and the intra-lever gap 21.

For example, the first connection electrode 71 is a conductor pattern which extends from the first electrode 14a to the first support portion 22 along the first direction L1. However, the present invention is not limited to this case. The first connection electrode 71 may be formed of a material which is different from that of the first electrode 14a.

The second connection electrode 72 is formed on the cantilever 4, and is formed so as to extend to be closer to the distal end portion 4b side relative to the first support portion 22 from the proximal end portion 4a of the first support portion 22 along the first direction L1. In addition, for example, the second connection electrode 72 is formed of a material which is same that of the first electrode 14a.

Similarly to the first displacement detection portion 25, the second displacement detection portion 26 is electrically connected to the second electrode 14b via a third connection electrode 73 which is disposed between the second displacement detection portion 26 and the gap 13, and is electrically connected to the connection portion 27 via a fourth connection electrode 74 which is disposed between the second displacement detection portion 26 and the intra-lever gap 21.

For example, the third connection electrode 73 is a conductor pattern which extends from the second electrode 14b toward the second support portion 23 along the first direction L1. However, the present invention is not limited to this case. The third connection electrode 73 may be formed of a material which is different from that of the second electrode 14b.

The fourth connection electrode 74 is formed on the cantilever 4, and is formed so as to extend to be closer to the distal end portion 4b side relative to the second support portion 23 from the proximal end portion 4a of the second support portion 23 along the first direction L1. In addition, for example, the fourth connection electrode 74 is formed of a material which is same that of the second electrode 14b.

According to this configuration, the first displacement detection portion 25 and the second displacement detection portion 26 are electrically connected to each other in series via the second connection electrode 72, the connection portion 27, and the fourth connection electrode 74.

In addition, similarly to the first displacement detection portion 25 and the second displacement detection portion 26, the connection portion 27 is formed such that the length along the first direction L1 is shorter than the length along the second direction L2. However, the present invention is not limited to this case. Similarly to the first embodiment, the connection portion 27 may be formed such that the length along the first direction L1 is longer than the length along the second direction L2.

According to the pressure sensor 70 configured as described above, in addition to effects similar to those of the first embodiment, the following effects can be achieved.

Since the lengths along the second direction L2 of the first displacement detection portion 25 and the second displacement detection portion 26 are longer than those along the first direction L1 thereof, it is possible to dispose the first displacement detection portion 25 and the second displacement detection portion 26 along the bending line when the cantilever 4 is bent. Accordingly, when the cantilever 4 is bent, since it is possible to dispose the first displacement detection portion 25 and the second displacement detection portion 26 at positions at which stress usually concentrates, it is possible to further improve detection sensitivity.

Moreover, since the entire first displacement detection portion 25 and the entire second displacement detection portion 26 can be distorted according to the bending of the cantilever 4, it is possible to effectively improve the detection sensitivity. In addition, since it is possible to decrease the lengths Wd1 of the first displacement detection portion 25 and the second displacement detection portion 26 along the first direction L1, it is possible to easily increase (improve) the resistance values of the first displacement detection portion 25 and the second displacement detection portion 26, and it is possible to decrease power consumption.

Moreover, similarly to the first embodiment, since the first displacement detection portion 25 and the second displacement detection portion 26 are electrically connected to each other in series via the second connection electrode 72, the connection portion 27, and the fourth connection electrode 74, the entire electric resistance value R can be a sum of the electric resistance value Ra of the first displacement detection portion 25, the electric resistance value Rb of the second displacement detection portion 26, and the electric resistance value Rc of the connection portion 27. Accordingly, it is possible to easily increase the entire electric resistance value R, and it is possible to improve detection sensitivity and decrease power consumption.

Compared to the first embodiment, in the case of the present embodiment, since it is possible to more easily decrease the sizes of the first displacement detection portion 25, the second displacement detection portion 26, and the connection portion 27, it is possible to easily prevent the first displacement detection portion 25, the second displacement detection portion 26, and the connection portion 27 from being exposed from the outside. Accordingly, the first displacement detection portion 25, the second displacement detection portion 26, and the connection portion 27 are not easily influenced from the outside. Accordingly, it is possible to easily improve the detection accuracy, and a small amount of a doping agent is used.

First Modification Example of Second Embodiment

In the second embodiment, the first displacement detection portion 25 and the second displacement detection portion 26 are connected in series via the connection portion 27. However, the connection portion 27 is not an essential component.

Figure 19:
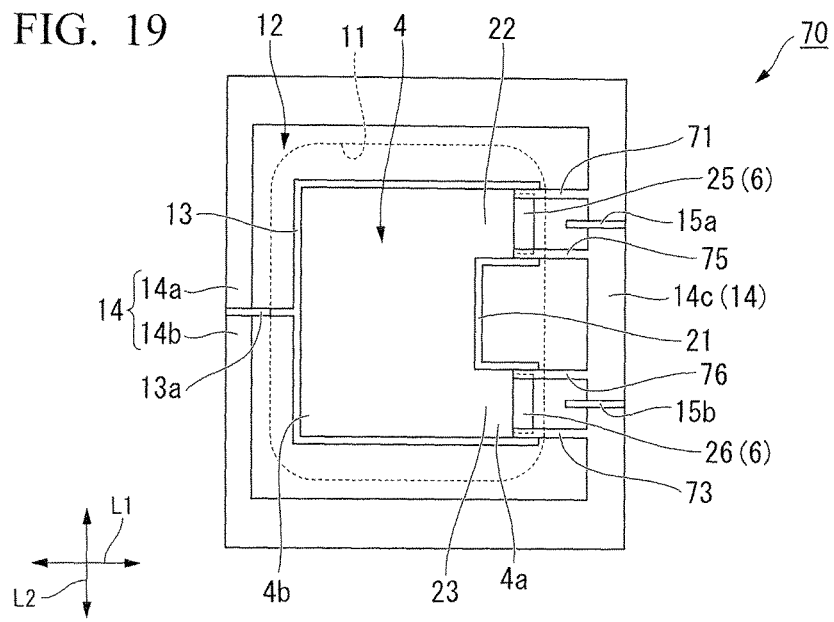
FIG. 19 is a plan view showing a configuration of a pressure sensor according to a first modification example of the second embodiment of the present invention.

For example, as shown in FIG. 19, the first displacement detection portion 25 and the second displacement detection portion 26 may be electrically connected to each other in series via a fifth connection electrode 75, the short-circuit electrode 14c, and a sixth connection electrode 76.

The short-circuit electrode 14c is electrically separated from the first electrode 14a and the second electrode 14b by the first inter-electrode gap 15a and the second inter-electrode gap 15b.

The fifth connection electrode 75 is disposed between the first displacement detection portion 25 and the intra-lever gap 21, and for example, is a conductor pattern which extends from the short-circuit electrode 14c to the first support portion 22 along the first direction L1. However, the present invention is not limited to this. The fifth connection electrode 75 may be formed of a material different from that of the short-circuit electrode 14c.

The sixth connection electrode 76 is disposed between the second displacement detection portion 26 and the intra-lever gap 21, and for example, is a conductor pattern which extends from the short-circuit electrode 14c to the second support portion 23 along the first direction L1. However, the present invention is not limited to this case. The sixth connection electrode 76 may be formed of a material different from that of the short-circuit electrode 14c.

In the case of the pressure sensor 70 configured as described above, since the first displacement detection portion 25 and the second displacement detection portion 26 are connected in series via the fifth connection electrode 75, the short-circuit electrode 14c, and the sixth connection electrode 76, the connection portion 27 shown in FIG. 17 is not needed.

Accordingly, it is possible to increase the ratio of the electric resistance values (the electric resistance values of the first displacement detection portions 25 and the second displacement detection portions 26) effective for detecting the bending of the cantilever 4 in the electric resistance values of the current path, and it is possible to improve detection sensitivity.

Second Modification Example of Second Embodiment

In the above-described first modification example, the first displacement detection portion 25 and the second displacement detection portion 26 are connected to each other in series via the fifth connection electrode 75, the short-circuit electrode 14c, and the sixth connection electrode 76. However, the first displacement detection portion 25 and the second displacement detection portion 26 are electrically separated from each other.

Figure 20:
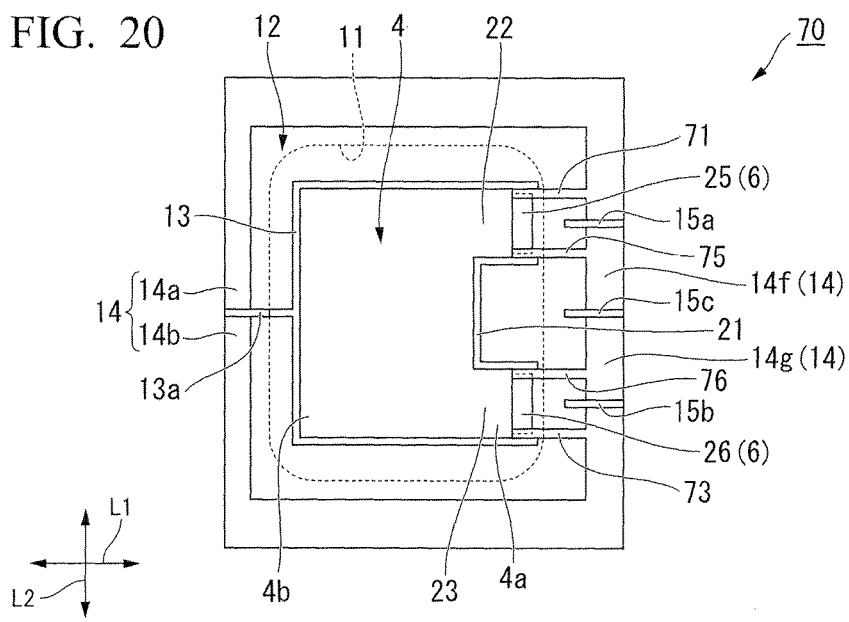
FIG. 20 is a plan view showing a configuration of a pressure sensor according to a second modification example of the second embodiment of the present invention.

For example, as shown in FIG. 20, the first displacement detection portion 25 and the second displacement detection portion 26 may be electrically separated from each other, and may be electrically connected to four electrodes different from each other, that is, the first electrode 14a, the second electrode 14b, the third electrode 14f, and the fourth electrode 14g.

The first electrode 14a, the second electrode 14b, the third electrode 14f, and the fourth electrode 14g are electrically separated from each other by the gap 13, the first inter-electrode gap 15a, the second inter-electrode gap 15b, and the third inter-electrode gap 15c.

Figure 21:
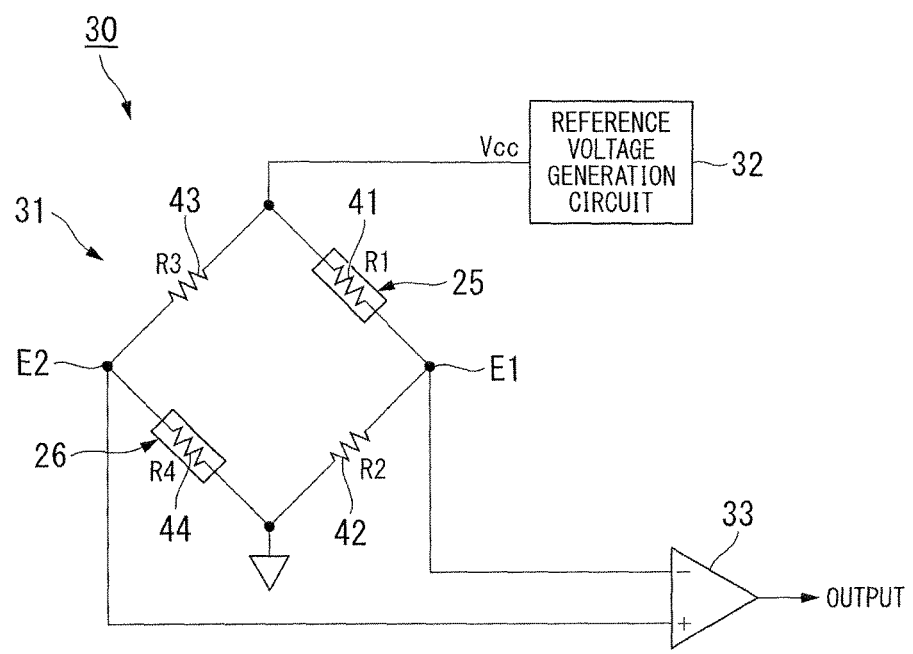
FIG. 21 is a configuration diagram of a detection circuit of the pressure sensor according to the second modification example of the second embodiment of the present invention.

In the pressure sensor 70 configured as described above, as shown in FIG. 21, in the bridge circuit 31 of the detection circuit 30, the electric resistance value R1 of the first resistor portion 41 becomes the electric resistance value of the first displacement detection portion 25, and the electric resistance value R4 of the fourth resistor portion 44 becomes the electric resistance value of the second displacement detection portion 26. The second resistor portion 42 and the third resistor portion 43 are fixed resistances, and include electric resistance values R2 and R3.

Accordingly, in the pressure sensor 70, if the change amount (that is, increase) of the electric resistance value of the first displacement detection portion 25 is defined as the first change amount $\Delta R1$, the voltage of the connection point E1 decreases according to the increase of the first change amount $\Delta R1$. If the change amount (that is, increase) of the electric resistance value of the second displacement detection portion 26 is defined as the second change amount $\Delta R4$, the voltage of the connection point E2 increases according to the increase of the second change amount $\Delta R4$.

Accordingly, a potential difference between the two connection points E1 and E2 of the bridge circuit 31 is a sum of the absolute values of the voltage changes of the two connection points E1 and E2. Therefore, as it were, it is possible to additionally detect the change of the electric resistance value of each of the first and second displacement detection portions 25 and 26 according to bending of the cantilever 4, and it is possible to improve detection sensitivity.

The above-described embodiments are exemplified and do not limit the claims. The embodiments can be variously embodied, and various omissions, replacements, and modifications can be applied to the embodiments within a scope which does not depart from the gist of the present invention. The embodiments or modifications thereof are included in the scope of the invention or the gist thereof, and are included in the invention disclosed in the claims and the scope equivalent to the claims.

INDUSTRIAL APPLICABILITY

According to the present invention, it is possible to decrease power consumption due to pressure detection and reduce the occurrence of a leakage current. Accordingly, industrial applicability can be realized.

REFERENCE SIGNS LIST

L1: first direction
L2: second direction
W: lengths of first and second support portions (branch portions) along second direction
Wd: lengths of first and second displacement detection portion (displacement detection portion) along second direction
Wd1: lengths of first and second displacement detection portion (displacement detection portion) along first direction 1, 70: pressure sensor
3: sensor main body
4: cantilever
4a: proximal end portion of cantilever
4b: distal end portion of cantilever
6: detection portion
10: cavity
11: communication opening
12: frame portion
14a, 14b: first electrode, second electrode (electrode)
14f, 14g: third electrode, fourth electrode (electrode)
15a, 15b: first inter-electrode gap, second inter-electrode gap (detection portion gap, partition portion)
21: intra-lever gap (gap)
22, 23: first support portion, second support portion (branch portion)
24: doped layer (piezoresistor)
25, 26: first displacement detection portion, second displacement detection portion (displacement detection portion)
25a, 26a: first electrode end portion, second electrode end portion
30: detection circuit (signal output portion)
60: reference sensor
61: lever portion
62, 63: first shape portion, second shape portion (shape portion)
64, 65: first reference portion, second reference portion (reference portion)
251, 252: first displacement detection portion (branch detection portion)
261, 262: second displacement detection portion (branch detection portion)
551~553: first branch gap (detection portion gap, partition portion)
561~563: second branch gap (detection portion gap, partition portion)
2511~2513, 2521~2523: first displacement detection portion (branch detection portion)
2611~2613, 2621~2623: second displacement detection portion (branch detection portion)

The invention claimed is:

1. A pressure sensor which detects variation in pressures, comprising:
a hollow sensor main body which includes a cavity formed inside the sensor main body and a communication opening which allows the cavity and the outside of the sensor main body to communicate with each other; and
a cantilever which is disposed so as to close the communication opening in a cantilever state in which a distal end portion of the cantilever is a free end and a proximal end portion thereof is supported by the sensor main body, and which is configured to bend according to a pressure difference between the cavity and the outside of the sensor main body,
wherein:
a gap which configures a portion of the communication opening is formed on the proximal end portion,
the proximal end portion is partitioned into a plurality of branch portions by the gap in a second direction orthogonal to a first direction in which the proximal end portion and the distal end portion are connected to each other in plan view,
at least any one of the plurality of branch portions includes a displacement detection portion which detects displacement according to the bending of the cantilever on the basis of a change in a resistance value corresponding to the displacement,
a length of the displacement detection portion along the second direction is shorter than a length of the branch portion along the second direction,
the displacement detection portion includes a plurality of branch detection portions which are electrically partitioned in the second direction by a partition portion having a larger resistance value than that of the displacement detection portion,
the branch detection portions are electrically connected to each other via a connection portion so as to go around the outside of the partition portion, and
the branch detection portions and the connection portion are each configured of a piezoresistor.

2. The pressure sensor according to claim 1,
wherein a resistance value of a portion of the displacement detection portion on the proximal end portion side is larger than a resistance value of a portion of the displacement detection portion on the distal end portion side in the first direction.

3. The pressure sensor according to claim 1,
wherein the partition portion is a detection portion gap which configures a portion of the communication opening.

4. The pressure sensor according to claim 3,
wherein the branch detection portions are connected to electrodes which are different from each other.

5. The pressure sensor according to claim 1,
wherein the branch detection portions are connected to electrodes which are different from each other.

6. The pressure sensor according to claim 5, further comprising:
a plurality of reference portions which include a lever portion which is made of the same material and has the same shape as those of the cantilever, a plurality of shape portions which are formed on the lever portion and have the same shapes as those of the plurality of branch portions, and a piezoresistor which is provided in at least any one of the plurality of shape portions, in which the reference portions have the same shapes as those of the plurality of branch detection portions; and
a signal output portion which outputs a signal corresponding to a difference between each of the plurality of branch detection portions and each of the plurality of reference portions.

7. The pressure sensor according to claim 1,
wherein the displacement detection portion is formed such that a length of the displacement detection portion along the first direction is shorter than a length thereof along the second direction.

8. The pressure sensor according to claim 7,
wherein displacement detection portions are separately provided on at least two adjacent branch portions among the plurality of branch portions, and
wherein the displacement detection portions which are provided in the two branch portions are electrically connected to each other in series.

9. The pressure sensor according to claim 7,
wherein displacement detection portions are separately provided on at least two adjacent branch portions among the plurality of branch portions, and
wherein the displacement detection portions which are provided in the two branch portions are electrically separated from each other.

* * * * *